United States Patent
Baba

(10) Patent No.: US 9,239,514 B2
(45) Date of Patent: Jan. 19, 2016

(54) IMAGING APPARATUS AND ELECTRONIC DEVICE FOR PRODUCING STEREOSCOPIC IMAGES

(75) Inventor: Tomohiko Baba, Kanagawa (JP)

(73) Assignee: Sony Corporation, Tokyo (JP)

( * ) Notice: Subject to any disclaimer, the term of this patent is extended or adjusted under 35 U.S.C. 154(b) by 832 days.

(21) Appl. No.: 13/418,444

(22) Filed: Mar. 13, 2012

(65) Prior Publication Data

US 2012/0249752 A1    Oct. 4, 2012

(30) Foreign Application Priority Data

Mar. 28, 2011    (JP) .................................. 2011-069112

(51) Int. Cl.
| | |
|---|---|
| G03B 35/08 | (2006.01) |
| G02B 5/30 | (2006.01) |
| H04N 13/02 | (2006.01) |
| G02B 27/26 | (2006.01) |
| G02B 9/04 | (2006.01) |

(52) U.S. Cl.
CPC *G03B 35/08* (2013.01); *G02B 5/30* (2013.01); *G02B 5/3025* (2013.01); *G02B 27/26* (2013.01); *H04N 13/0203* (2013.01); *H04N 13/0217* (2013.01); *G02B 9/04* (2013.01)

(58) Field of Classification Search
CPC .............. H04N 13/02; H04N 13/0203; H04N 13/0217; H04N 13/235; H04N 13/0207; G02B 27/26; G02B 3/00; G02B 3/0006; G02B 5/30; G02B 5/3025; G02B 9/10; G02B 9/04; G02B 9/06; G02B 27/28; G02B 27/288; G03B 35/00; G03B 35/08
See application file for complete search history.

(56) References Cited

U.S. PATENT DOCUMENTS

| | | | | | |
|---|---|---|---|---|---|
| 4,688,906 | A | * | 8/1987 | Hilbert et al. | ............... 359/753 |
| 4,781,449 | A | * | 11/1988 | Hirakawa | ............ G02B 13/24 |
| | | | | | 359/753 |
| 5,499,142 | A | * | 3/1996 | Ohshita | ............... G02B 13/06 |
| | | | | | 359/715 |
| 5,717,453 | A | * | 2/1998 | Wohlstadter | ................ 348/46 |
| 5,966,251 | A | * | 10/1999 | Nagahara | ............. G02B 9/34 |
| | | | | | 359/739 |
| 6,219,182 | B1 | * | 4/2001 | McKinley | .................. 359/407 |

(Continued)

FOREIGN PATENT DOCUMENTS

| | | | | |
|---|---|---|---|---|
| EP | 2264504 | A1 * | 12/2010 | ............ G02B 13/04 |
| JP | 2004-309868 | | 11/2004 | |

(Continued)

*Primary Examiner* — Dave Czekaj
*Assistant Examiner* — David N Werner
(74) *Attorney, Agent, or Firm* — Michael Best & Friedrich LLP

(57) ABSTRACT

An imaging apparatus includes: a first lens group disposed on a subject side of a diaphragm in the vicinity of which two polarizers that polarize light from a subject are disposed, the polarizers being first and second polarizers whose polarization directions are perpendicular to each other; a second lens group disposed on the side of the diaphragm where an imaging device is present, over a photodetection surface of which third and fourth polarizers are disposed, the third and fourth polarizers having polarization directions parallel to the polarization direction of the first and second polarizers, respectively; and an image processor that produces stereoscopic images based on image data produced by converting light incident on the imaging device through the first lens group and the second lens group. The second lens group has positive refracting power, and characteristics of the first lens group and the second lens group satisfy certain conditions.

16 Claims, 8 Drawing Sheets

(56) References Cited

U.S. PATENT DOCUMENTS

| | | | |
|---|---|---|---|
| 6,624,935 B2 * | 9/2003 | Weissman et al. | 359/464 |
| 8,264,785 B2 * | 9/2012 | Ando | G02B 9/34 359/715 |
| 8,885,921 B2 * | 11/2014 | Kutcka | G02B 27/26 382/100 |
| 2004/0155176 A1 * | 8/2004 | Ito | G02B 9/34 250/216 |
| 2008/0080852 A1 * | 4/2008 | Chen et al. | 396/324 |
| 2010/0007718 A1 * | 1/2010 | Rohaly et al. | 348/46 |
| 2010/0321777 A1 * | 12/2010 | Martinez et al. | 359/465 |
| 2011/0033177 A1 * | 2/2011 | Kuroki | 396/63 |
| 2011/0037832 A1 * | 2/2011 | Gharib | G02B 7/34 348/46 |
| 2012/0133743 A1 * | 5/2012 | Hiramoto et al. | 348/46 |

FOREIGN PATENT DOCUMENTS

| | | | | |
|---|---|---|---|---|
| WO | WO 2011003168 A1 * | 1/2011 | | A61B 1/04 |
| WO | WO 2011003208 A1 * | 1/2011 | | G02B 27/22 |
| WO | WO 2011097037 A1 * | 8/2011 | | G06T 1/00 |
| WO | WO 2011160200 A1 * | 12/2011 | | G03B 35/26 |
| WO | WO 2011160212 A1 * | 12/2011 | | G03G 35/26 |

* cited by examiner

FIG.4
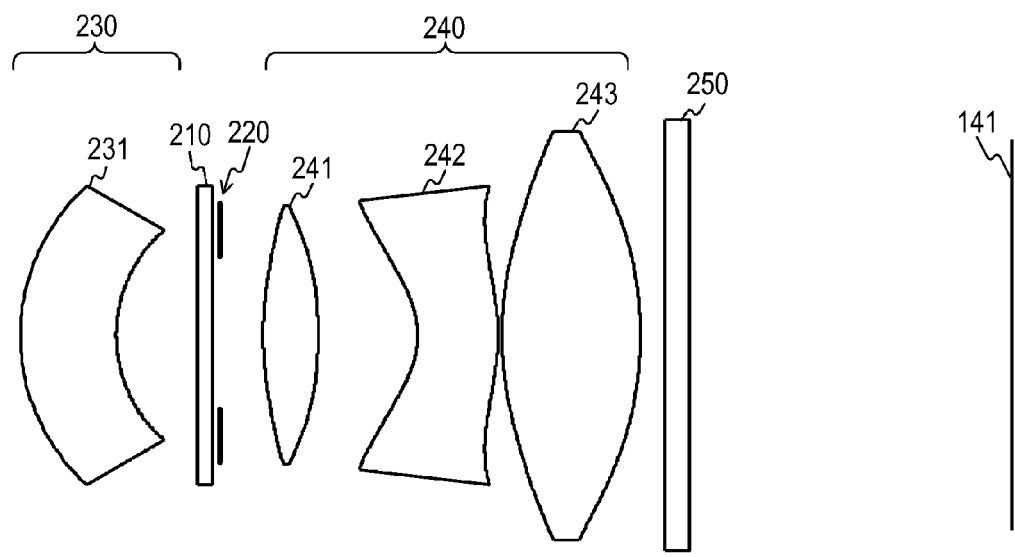
FIG.5A
SPHERICAL ABERRATION
Fno1:2.8
FIG.5B
ASTIGMATISM
ω=20.8°
FIG.5C
DISTORTION
ω=20.8°
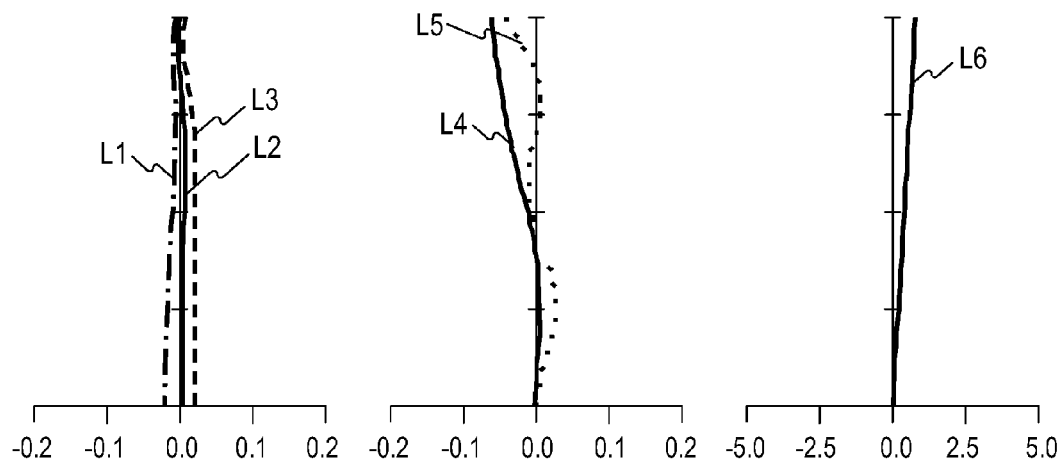

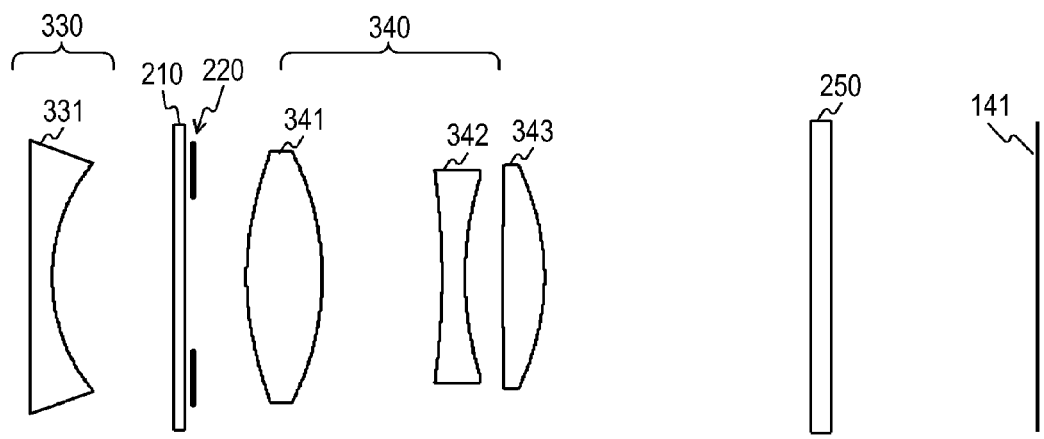
FIG.6
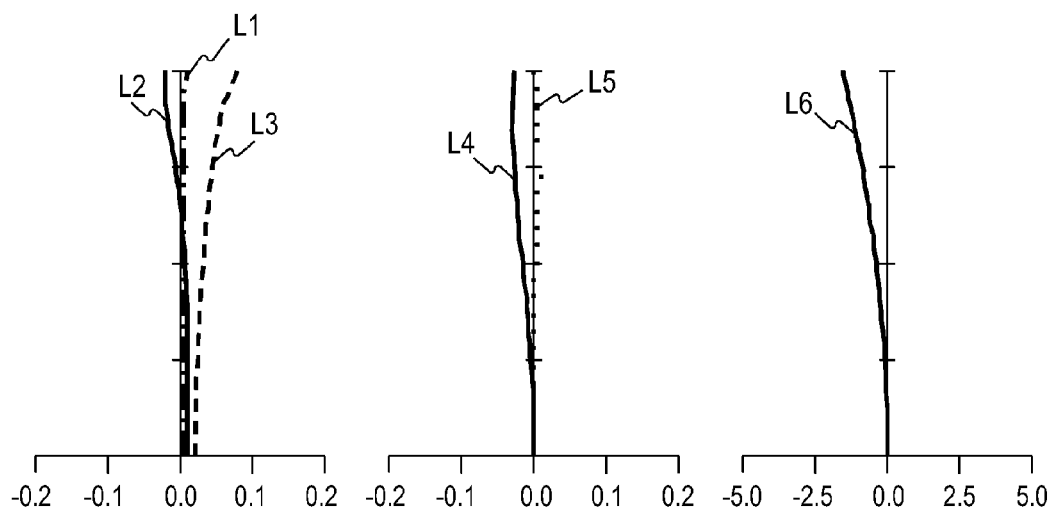
FIG.7A
SPHERICAL ABERRATION
Fno1:2.8
FIG.7B
ASTIGMATISM
ω=20.9°
FIG.7C
DISTORTION
ω=20.9°

FIG.8
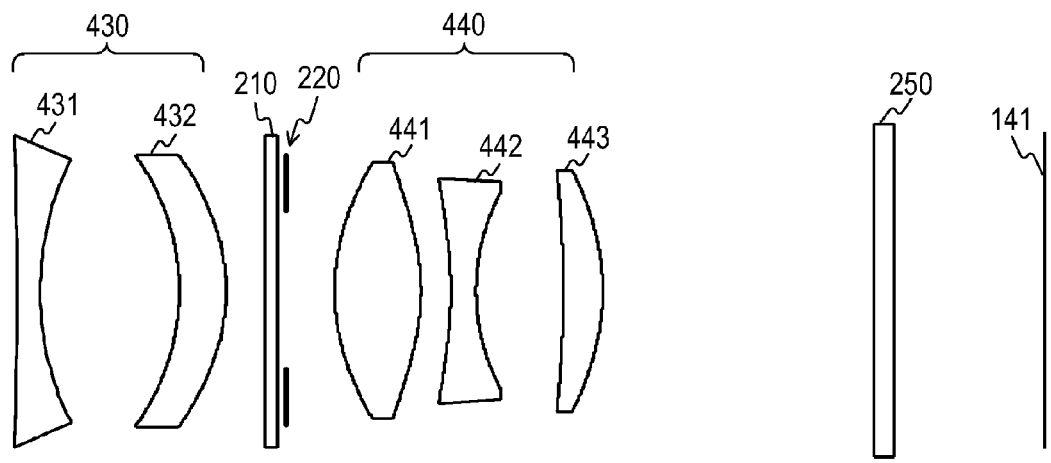
FIG.9A
SPHERICAL
ABERRATION
Fno1:2.8
FIG.9B
ASTIGMATISM
ω=20.9°
FIG.9C
DISTORTION
ω=20.9°
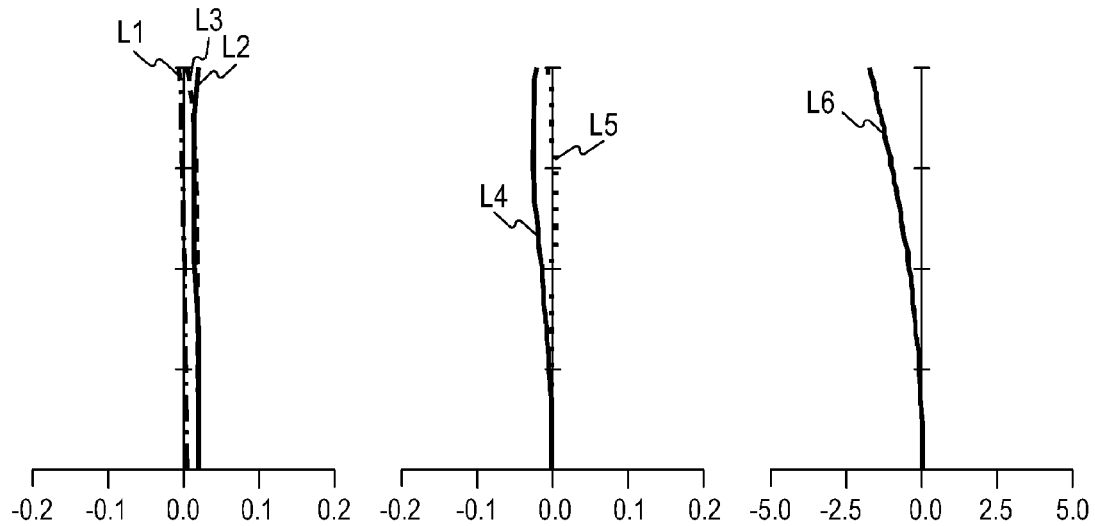

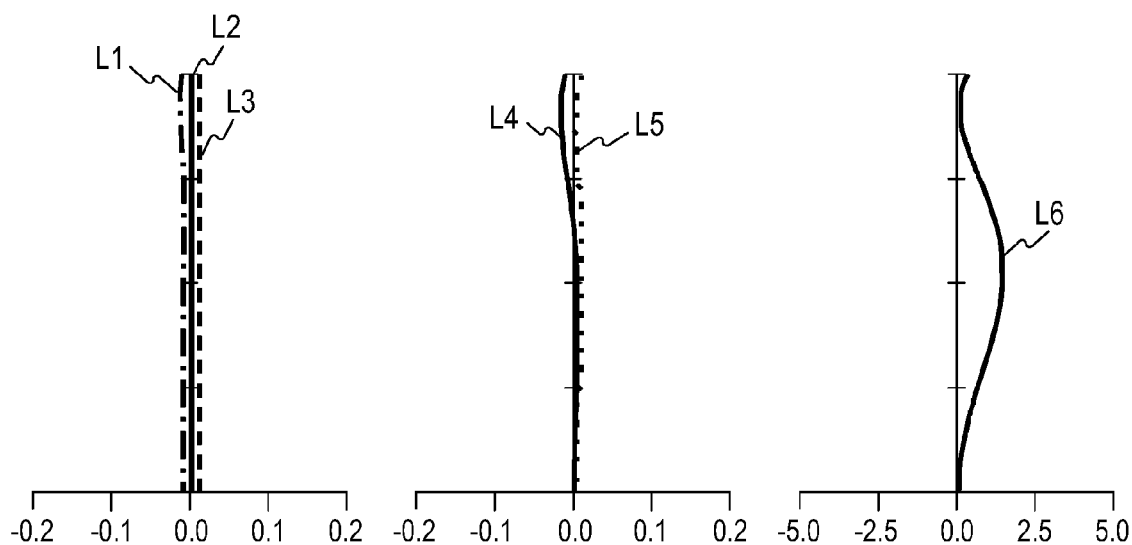

IMAGING APPARATUS AND ELECTRONIC DEVICE FOR PRODUCING STEREOSCOPIC IMAGES

FIELD

The present technology relates to an imaging apparatus, and particularly to an imaging apparatus and an electronic apparatus that produce stereoscopic images.

BACKGROUND

There have been proposed digital still cameras, digital video camcorders (camera-recorder hybrids), and other imaging apparatus that produce image data for displaying stereoscopic images that allow a viewer to experience stereoscopic vision with the aid of parallax between the right and left eyes.

For example, there has been proposed an imaging apparatus that includes two lenses and one imaging device and produces two images (image for right vision and image for left vision) for displaying stereoscopic images (see JP-A-2004-309868, for example).

SUMMARY

According to the technology of the related art described above, the two lenses and the one imaging device can be used to produce two images (image for right vision and image for left vision). Provision of the two lenses, however, complicates the optical system. To address the problem, it is conceivable to design an imaging apparatus in which a single lens unit includes polarizing filters for dividing subject light into right and left light fluxes and stereoscopic images are produced by using the right and left light fluxes. When the imaging apparatus is accommodated in a mobile phone or any other compact information terminal, however, a space in which the imaging apparatus is accommodated is limited in many cases. To incorporate the polarizing filters in the imaging apparatus, it is important to provide a space in which the polarizing filters are incorporated while the size of the imaging apparatus is reduced.

Thus, it is desirable to reduce the size of a system capable of producing stereoscopic images.

One embodiment of the present technology is directed to an imaging apparatus and an electronic apparatus including a first lens group disposed on a subject side of a diaphragm in the vicinity of which two polarizers that polarize light from a subject are disposed, the polarizers being a first polarizer and a second polarizer whose polarization directions are perpendicular to each other; a second lens group disposed on the side of the diaphragm where an imaging device is present, over a photodetection surface of which a third polarizer and a fourth polarizer are disposed, the third polarizer having a polarization direction parallel to the polarization direction of the first polarizer and the fourth polarizer having a polarization direction parallel to the polarization direction of the second polarizer; and an image processor that produces stereoscopic images based on image data produced by converting light incident on the imaging device through the first lens group and the second lens group. In the imaging apparatus and the electronic apparatus, the second lens group has positive refracting power, and characteristics of the first lens group and the second lens group satisfy certain conditions. The lens unit described above, which is so configured that the polarizers are disposed between the first lens group and the second lens group and the second lens group has positive power, can be used to produce stereoscopic images.

In the embodiment, as one of the certain conditions, the focal length of the entire optical system of the imaging apparatus including the first lens group and the second lens group may satisfy the following conditional expression (1):

$$3.3 \le f \le 100 \quad (1)$$

where f represents the focal length of the entire optical system of the imaging apparatus. The lens unit described above, which is so configured that the focal length f of the entire optical system of the imaging apparatus satisfies "$3.3 \le f \le 100$," can be used to produce stereoscopic images.

In this case, a bending factor of a lens that forms the first lens group may satisfy the following conditional expression (2):

$$0.66 \le qL1 \le 100 \quad (2)$$

where qL1 represents the bending factor of a lens that forms the first lens group. The lens unit described above, which is so configured that the bending factor of a lens that forms the first lens group satisfies "$0.66 \le qL1 \le 100$," can be used to produce stereoscopic images.

In the embodiment described above, the focal length of the first lens group may satisfy the following conditional expression (3) and the focal length of the second lens group may satisfy the following conditional expression (4):

$$-\infty \le fg1/f \le -0.3 \quad (3)$$

$$0.3 \le fg2/f \le 10 \quad (4)$$

where fg1 represents the focal length of the first lens group, and fg2 represents the focal length of the second lens group. The lens unit described above, which is so configured that the focal length of the first lens group satisfies "$-\infty \le fg1/f \le -0.3$" and the focal length of the second lens group satisfies "$0.3 \le fg2/f \le 10$" can be used to produce stereoscopic images.

In the embodiment described above, the second lens group is formed of at least two lenses, and the focal length of a first lens that forms the second lens group and is closest to the subject may satisfy the following conditional expression (5) and the focal length of a second lens that forms the second lens group and is closest to the imaging device may satisfy the following conditional expression (6):

$$0.3 \le fL1/f \le 2 \quad (5)$$

$$0.5 \le fL2/f \le 2 \quad (6)$$

where fL1 represents the focal length of the first lens, and fL2 represents the focal length of the second lens. The lens unit described above, which is so configured that the focal length of the first lens group satisfies "$0.3 \le fL1/f \le 2$" and the focal length of the second lens group satisfies "$0.5 \le fL2/f \le 2$," can be used to produce stereoscopic images.

In the embodiment described above, a horizontal viewing angle of the entire optical system of the imaging apparatus including the first lens group and the second lens group may satisfy the following conditional expression (7):

$$6 \le \theta h \le 50 \quad (7)$$

where θh represents the horizontal viewing angle of the entire optical system of the imaging apparatus. The lens unit described above, which is so configured that the horizontal viewing angle of the entire optical system satisfies "$6 \le \theta h \le 50$," can be used to produce stereoscopic images.

In the embodiment described above, the first polarizer and the second polarizer may be disposed adjacent to each other, the first polarizer and the second polarizer connected to each other along a first direction; the imaging device may have pixels arranged in the photodetection plane thereof in a matrix identified by the first direction and a second direction perpendicular thereto; and the third polarizer and the fourth polarizer may be alternately disposed on an arrangement unit basis, the arrangement unit being a line or lines and the line formed of pixels in the first direction in the imaging device. The imaging device described above, which is so configured that the third polarizer and the fourth polarizer are alternately disposed on an arrangement unit basis, the arrangement unit being a line or lines described above, can be used to produce stereoscopic images.

In the embodiment described above, the first polarizer and the second polarizer may be disposed adjacent to each other on opposite sides of the second direction as a boundary. The first polarizer and the second polarizer can thus be disposed adjacent to each other.

The present technology provides an excellent effect of reducing the size of a system capable of producing stereoscopic images.

BRIEF DESCRIPTION OF THE DRAWINGS

FIG. 4 is a diagrammatic view showing an example of the configuration of a lens section in the first embodiment of the present technology;

FIGS. 5A to 5C are aberration diagrams showing aberrations produced by the lens section in the first embodiment of the present technology based on values in Numerical Example 1 associated with FIG. 4;

FIG. 6 is a diagrammatic view showing an example of the configuration of a lens section in a second embodiment of the present technology;

FIGS. 7A to 7C are aberration diagrams showing aberrations produced by the lens section in the second embodiment of the present technology;

FIG. 8 is a diagrammatic view showing an example of the configuration of a lens section in a third embodiment of the present technology;

FIGS. 9A to 9C are aberration diagrams showing aberrations produced by the lens section in the third embodiment of the present technology;

FIGS. 11A to 11C are aberration diagrams showing aberrations produced by the lens section in the fourth embodiment of the present technology.

DETAILED DESCRIPTION

Modes for carrying out the present technology (hereinafter referred to as "embodiments") will be described below. The description will be made in the following order.

1. First embodiment (stereoscopic image capturing lens: Numerical Example 1)

2. Second embodiment (stereoscopic image capturing lens: Numerical Example 2)

3. Third embodiment (stereoscopic image capturing lens: Numerical Example 3)

4. Fourth embodiment (stereoscopic image capturing lens: Numerical Example 4)

<1. First Embodiment>

[Example of Functional Configuration of Imaging Apparatus]

Figure 1:
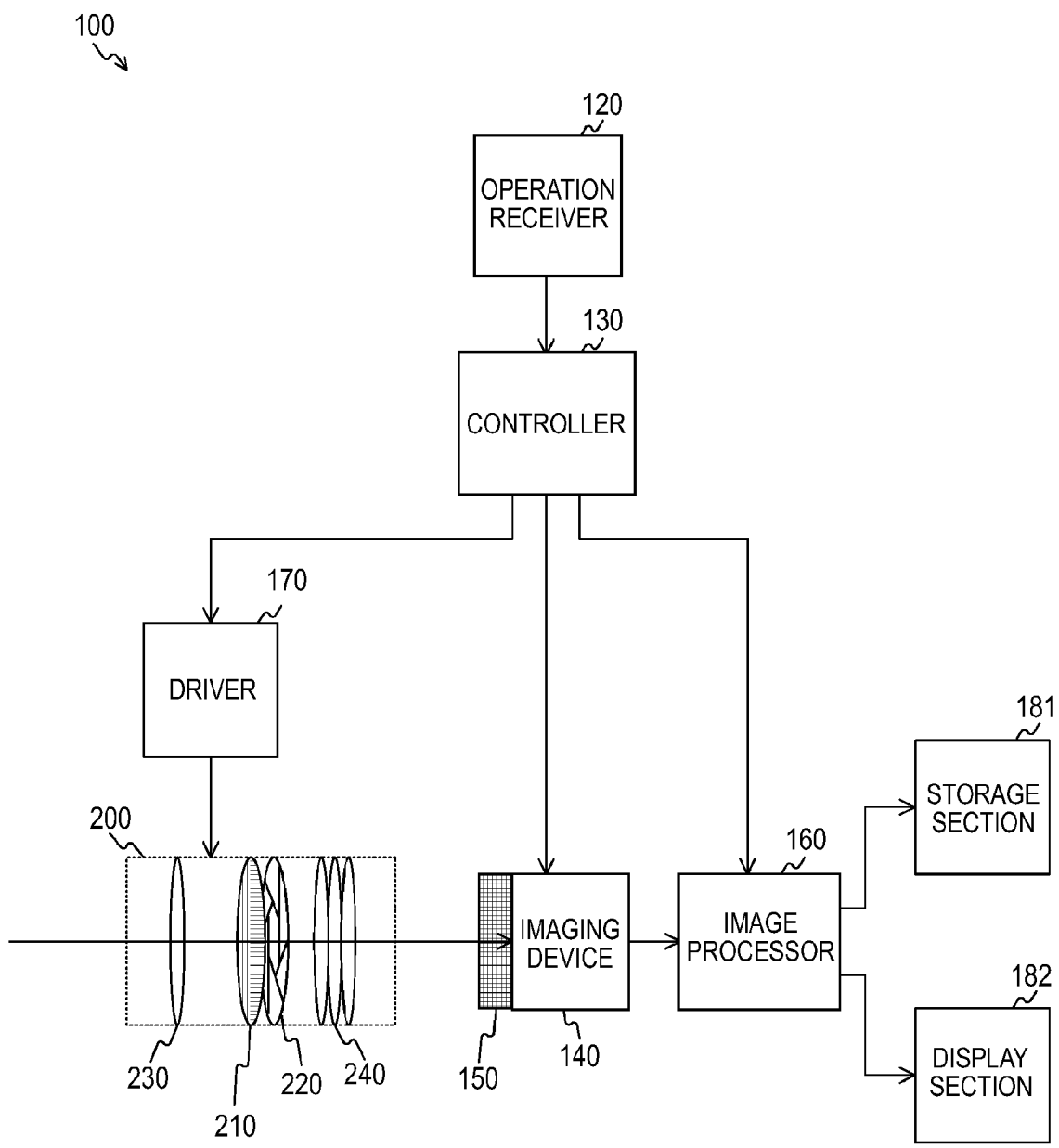
FIG. 1 is a block diagram showing an example of the functional configuration of an imaging apparatus in a first embodiment of the present technology.

FIG. 1 is a block diagram showing an example of the functional configuration of an imaging apparatus 100 in a first embodiment of the present technology. The imaging apparatus 100 produces 3D images by using a single lens. The imaging apparatus 100 is conceivably a digital still camera, a digital video camcorder, or a camera accommodated in a mobile phone, a smartphone, or any other compact information terminal. In the first embodiment of the present technology, the description will be particularly made with reference to a camera accommodated in a compact information terminal.

The imaging apparatus 100 captures an image of a subject, produces image data (captured image), and records the produced image data as a 2D or 3D image content (still image content or video image content). The following description will primarily be made with reference to a case where a still image content (still image file) is recorded as an image content (image file).

The imaging apparatus 100 includes a lens section 200, an operation receiver 120, a controller 130, an imaging device 140, an imaging device polarizing unit 150, an image processor 160, a storage section 181, a display section 182, and a driver 170.

The operation receiver 120 receives user's operation. For example, when a shutter button (not shown) is pressed, the operation receiver 120 supplies the controller 130 with a signal according to the pressing action as an operation signal.

The controller 130 controls the action of each of the components in the image apparatus 100. FIG. 1 shows only primary signal lines and other signal lines are omitted. For example, when the shutter button is pressed and the controller 130 receives an operation signal that instructs it to start recording a still image, the controller 130 supplies the imaging device 140 and the image processor 160 with signals that instruct them to record the still image.

The lens section 200 collects light from a subject (subject light). In the embodiment of the present technology, the lens section 200 is assumed to be a single-focus lens. The lens section 200 includes a first lens group 230, a pupil polarizing unit 210, a diaphragm 220, and a second lens group 240. The lens section 200 will be described later in detail with reference to FIG. 4 and will not therefore be described below in detail.

The first lens group 230 is disposed on the object side (subject side) of the pupil polarizing unit 210 and the diaphragm 220 and collects subject light incident from the subject on the pupil polarizing portion 210 and the diaphragm 220.

The pupil polarizing unit 210 polarizes the subject light passing through an exit pupil (image of the diaphragm viewed from the imaging device side) and produces two subject light fluxes polarized in directions perpendicular to each other in order to produce stereoscopic images. Since stereoscopic images are formed of two images (image for right eye and image for left eye) shifted from each other in the horizontal direction (right-left direction), the pupil polarizing unit 210 includes two polarizers whose polarization directions are perpendicular to each other and which split the exit pupil (image of the diaphragm viewed from the imaging device side) into right and left portions. The pupil polarizing unit 210 is disposed in the vicinity of the diaphragm 220 so that the exit pupil can be efficiently split into right and left portions.

Each of the polarizers disposed in the pupil polarizing unit 210 can, for example, be a polarizer having a known configuration (polarizing plate or polarizing filter, for example). The pupil polarizing unit 210 will be described later with reference to FIG. 2A and will not therefore be described below in detail.

The diaphragm 220 is a light blocker with an opening that adjusts the amount of subject light incident on the imaging device 140 by changing the size of the opening driven by the driver 170. The diaphragm 220 is formed, for example, of a combination of a plurality of plate-shaped blades.

The second lens group 240 is disposed on the image plane side of the pupil polarizing unit 210 and the diaphragm 220 (the side where the imaging device 140 is present) and focuses the subject light having passed through the pupil polarizing unit 210 and the diaphragm 220 on the imaging device 140. The second lens group 240 is, for example, a combination of lenses so designed that they minimize aberrations contained in the subject light having passed through the first lens group 230 and the second lens group 240 (aberrations produced by the entire lens section 20). Further, the second lens group 240 is so configured that a predetermined lens that belongs thereto can be driven in the optical axis direction for focusing.

The imaging device polarizing unit 150 is a layer of polarizing filters so formed on the imaging device 140 that the pixels in the imaging device 140 can receive either of the two subject light fluxes polarized in directions perpendicular to each other by the pupil polarizing unit 210. In the imaging device polarizing unit 150, for example, two types of polarizing filters whose polarization directions are the same as those of the polarizing filters in the pupil polarizing unit 210 are so alternately arranged that each of the polarizing filters covers two rows of pixels. The imaging device polarizing unit 150 will be described later with reference to FIG. 2B and will not therefore be described below in detail.

The imaging device 140 is an image sensor that converts the received subject light into an electric signal in a photoelectric conversion process. The imaging device 140 can, for example, be a CMOS (complementary metal oxide semiconductor) sensor or any other x-y addressing type sensor, or a CCD (charge coupled device) sensor. The imaging device polarizing unit 150 is disposed on the light-incident side of the imaging device 140. That is, the imaging device polarizing unit 150 and the imaging device 140 form a polarization image sensor. The imaging device 140 independently but simultaneously receives the right and left light fluxes split by the pupil polarizing unit 120 (light fluxes corresponding to image for right vision and image for left vision). Image data for right vision and image data for left vision are thus produced based on the converted electric signal from the imaging device 140.

The image processor 160 performs various kinds of image processing on the electric signal outputted from the imaging device 140. The image processor 160, for example, converts the electric signal outputted from the imaging device 140 into a digital electric signal (pixel values) and then performs black level correction, defect correction, shading correction, mixed color correction, and other kinds of image processing. For example, the image processor 160 converts the electric signal (image data) outputted from the imaging device 140 into image data for right vision and image data for left vision (what is called 3D image processing). The image processor 160 then stores the converted image data for right vision and image data for left vision as a stereoscopic image content in the storage section 181. The image processor 160 further outputs the converted image data for right vision and image data for left vision as a stereoscopic image content to the display section 182 and displays it thereon.

The storage section 181 records the stereoscopic image content supplied from the image processor 160. The storage section 181 can, for example, be a removable recording medium (one or more recording media), such as a DVD (digital versatile disk) or any other disk and a memory card or any other semiconductor memory. Any of the storage media described above may be built in the imaging apparatus 100 or may be loaded and unloaded into and from the imaging apparatus 100.

The display section 182 displays an image based on the stereoscopic image content supplied from the image processor 160. The display section 182 is, for example, a color liquid crystal panel.

The driver 170 drives a movable member in the lens section 200. For example, the driver 170 drives a movable, focus-adjusting lens among a plurality of lenses in the second lens group 240 for focus adjustment. The driver 170 further controls insertion and removal of the pupil polarizing unit 210 when it is configured to be insertable and removable into and from the optical path.

[Example of Relationship Between Pupil Polarizing Unit and Imaging Device Polarizing Unit]

Figure 2A:
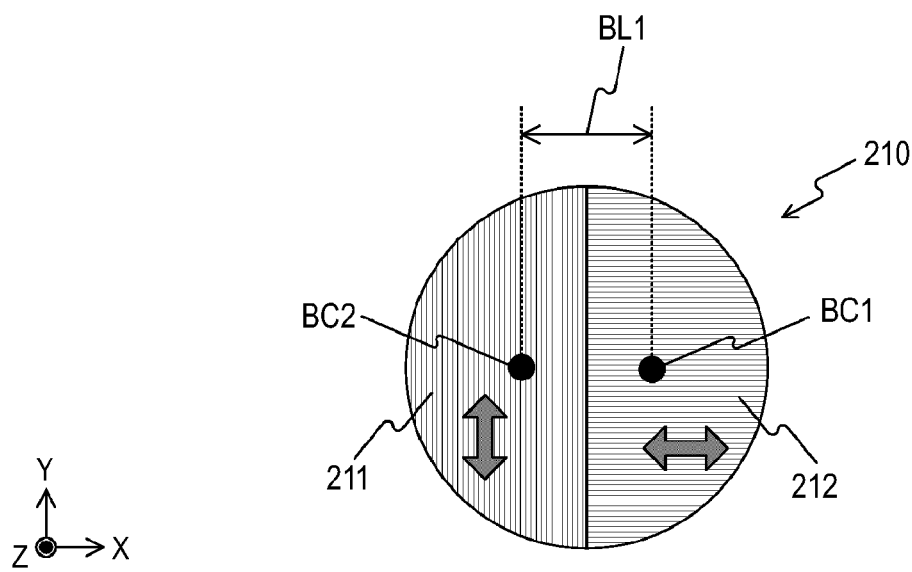
FIGS. 2A and 2B diagrammatically show a pupil polarizing unit and an imaging device polarizing unit in the first embodiment of the present technology.
Figure 2B:
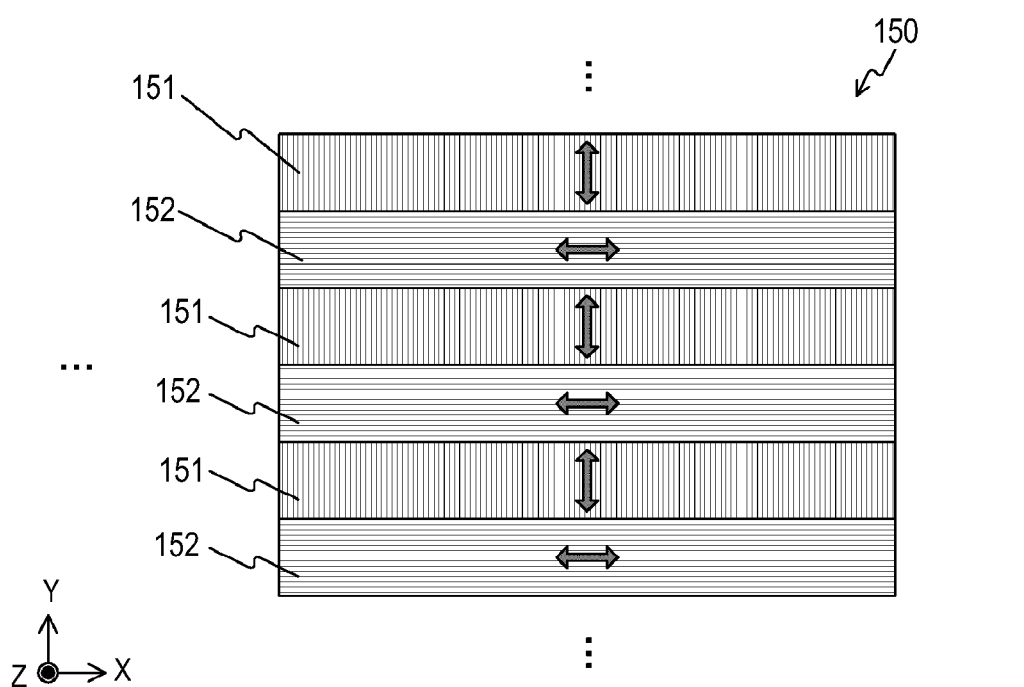

FIGS. 2A and 2B diagrammatically show the pupil polarizing unit 210 and the imaging device polarizing unit 150 in the first embodiment of the present technology.

FIG. 2A shows two types of polarizing element that form the pupil polarizing unit 210 (first polarizer 211 and second polarizer 212). FIG. 2A shows the polarization direction of each of the first polarizer 211 and the second polarizer 212 (the orientation of the electric field of light having passed through each of the polarizers), and the polarization direction is indicated by a gray arrow. That is, the first polarizer 211 transmits light in such a way that the electric field of the transmitted light is oriented along a Y-axis direction (up-down direction), and the second polarizer 212 transmits light in such a way that the electric field of the transmitted light is oriented along an X-axis direction (right-left direction).

The pupil polarizing unit 210 has, for example, a circular outer shape similar to that of each lens. Each of the first polarizer 211 and the second polarizer 212 has a semicircular outer shape that occupies one half the pupil polarizing unit 210. The boundary between the first polarizer 211 and the second polarizer 212 extends along the vertical direction (Y-axis direction). That is, in the pupil polarizing unit 210, the two polarizers (first polarizer 211 and second polarizer 212), whose polarization directions are perpendicular to each other, are so disposed that the boundary therebetween halves the exit pupil into right and left portions. The thus configured pupil polarizing unit 210 polarizes the subject light in accordance with which area of the exit pupil the subject light passes through (right half or left half).

FIG. 2A further shows the position of the center of gravity of the first polarizer 211 (center of gravity BC2) and the position of the center of gravity of the second polarizer 212 (center of gravity BC1). FIG. 2A shows an arrow representing the distance between the center of gravity BC2 and the center of gravity BC1 (base line length BL1). The distance between the centers of gravity (base line length) contributes to the degree of stereoscopic sensation provided by stereoscopic images. The larger the distance is (the longer the base line length is), the greater the difference between an image for the right eye and an image for the left eye, resulting in a stronger stereoscopic sensation.

FIG. 2B shows the two types of polarizing element that form the imaging device polarizing unit 150 (third polarizer 151 and fourth polarizer 152). FIG. 2B only shows part of the imaging device polarizing unit 150, which covers the pixels that form the imaging device 140, for ease of illustration. That is, the imaging device polarizing unit 150 is so configured that the area shown in FIG. 2B is repeatedly arranged in the X-axis and Y-axis directions.

FIG. 2B shows the polarization direction of each of the third polarizers 151 and the fourth polarizers 152, and the polarization direction is indicated by a gray arrow, as in FIG. 2A. That is, the third polarizers 151 have the same polarization direction as that of the first polarizer 211 shown in FIG. 2A, and the fourth polarizers 152 have the same polarization direction as that of the second polarizer 212 shown in FIG. 2A.

Each of the third polarizers 151 and the fourth polarizers 152 only transmits light polarized in the polarization direction of the polarizer and allows photodetectors in pixels covered with the polarizer to receive the transmitted light. That is, the third polarizers 151 transmit the light having passed through the first polarizer 211 but block the light having passed through the second polarizer 212, and the fourth polarizers 152 transmit the light having passed through the second polarizer 212 but block the light having passed through the first polarizer 211.

That is, when the first polarizer 211 is positioned in the right portion of the exit pupil (corresponding to the right eye of a viewer), the third polarizers 151 allow the pixels covered therewith to receive light that forms an image for the right eye. In this case, the second polarizer 212 is positioned in the left portion of the exit pupil (corresponding to the left eye of the viewer), and the fourth polarizers 152 allow the pixels covered therewith to receive light that forms an image for the left eye.

The positional relationship of the third polarizers 151 and the fourth polarizers 152 with the pixels in the imaging device 140 will next be described with reference to FIG. 3.

[Example of Arrangement of Polarizers at Imaging Device]

Figure 3:
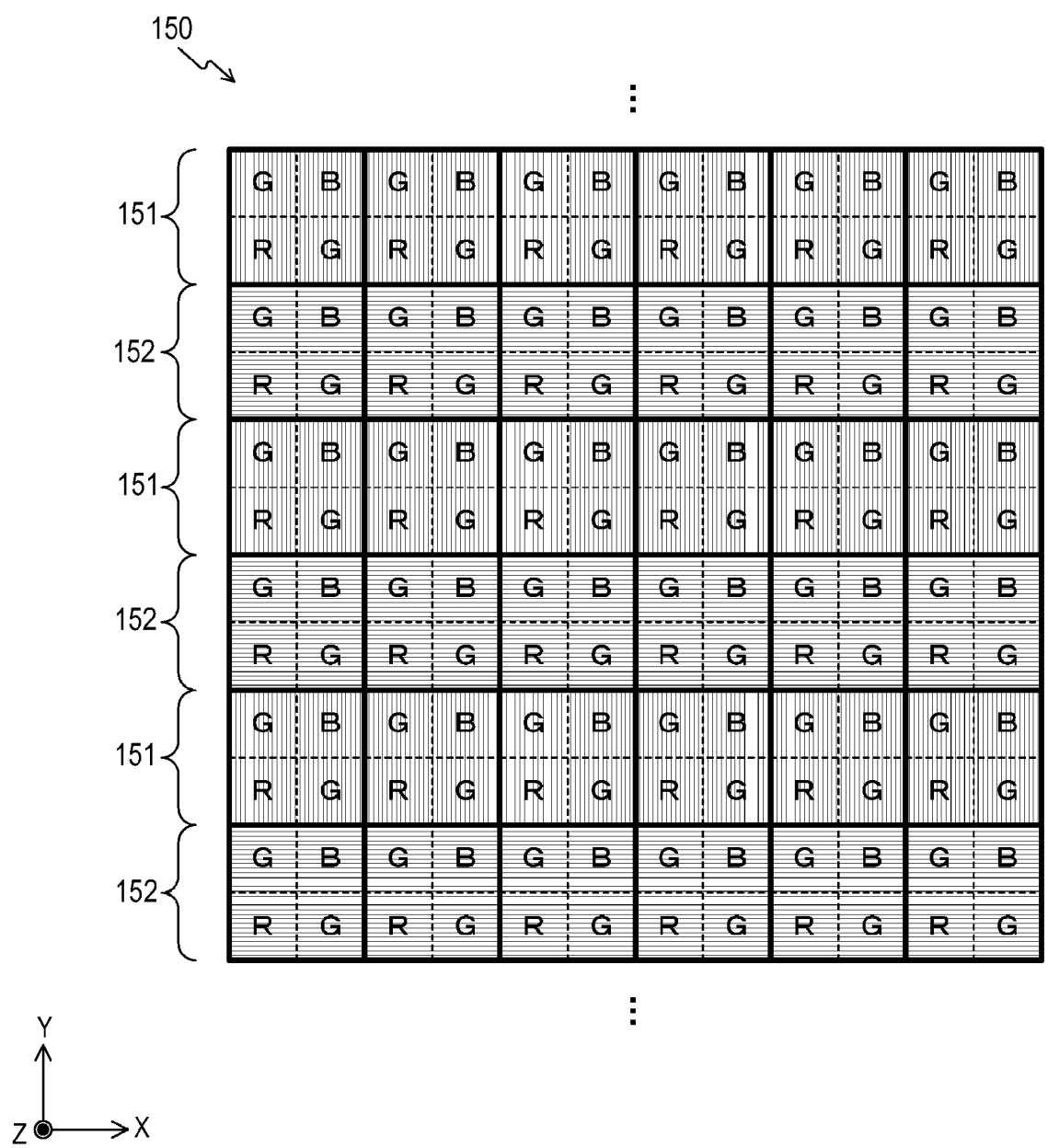
FIG. 3 diagrammatically shows the positional relationship of third polarizers and fourth polarizers that form an imaging device polarizing unit with pixels in an imaging device in the first embodiment of the present technology.

FIG. 3 diagrammatically shows the positional relationship of the third polarizers 151 and the fourth polarizers 152, which form the imaging device polarizing unit 150, with the pixels in the imaging device 140 in the first embodiment of the present technology.

The description will be made with reference to a case where the pixels in the imaging device 140 are disposed in a Bayer arrangement in FIG. 3. FIG. 3 is an enlarged view of part of the pixels in the imaging device 140. In FIG. 3, the third polarizers 151 and the fourth polarizers 152 that cover the corresponding pixels are labeled with characters written in a left portion of FIG. 3 and indicated by the directions of thin lines that hatch the pixels under the polarizers.

The Bayer arrangement is a pixel arrangement in which a basic block (group of pixels) formed of two pixels (in horizontal direction) by two pixels (in vertical direction) is periodically disposed. In FIG. 3, a thick-line square represents each area corresponding to the basic block, and the dotted line represents the boundary between the pixels in the basic block. In the basic block, two G (green) pixels are disposed along one diagonal, and an R (red) pixel and a B (blue) pixel are disposed along the other diagonal. Each G pixel includes a color filter that transmits green (G) light and receives the transmitted green light. Each R pixel includes a color filter that transmits red (R) light and receives the transmitted red light. Each B pixel includes a color filter that transmits blue (B) light and receives the transmitted blue light. In FIG. 3, each pixel is diagrammatically expressed by a square labeled with an in-square character representing the type of the pixel (G, R, or B).

The third polarizer 151 is so disposed that it covers a row of pixels arranged along the horizontal direction (X-axis direction) (two horizontal rows of pixels), as shown in FIG. 3. Vertically adjacent to the row of pixels (adjacent in Y-axis direction) is disposed the fourth polarizer 152, which covers a row of pixels arranged along the horizontal direction (two horizontal rows of pixels). The positional relationship between the polarizers and the pixels in the imaging device is repeated in the X-axis and Y-axis directions.

The third polarizers 151 and the fourth polarizers 152 are thus alternately disposed along the vertical direction. The horizontal length of each of the third polarizers 151 and the fourth polarizers 152, which generally extend in the horizontal direction, can be substantially equal to the horizontal length of the imaging device 140. Similarly, the vertical length of each of the third polarizers 151 and the fourth polarizers 152 can be substantially equal to the vertical length of two pixels in the imaging device 140.

As described above, in the imaging apparatus 100, the pupil polarizing unit 210 (first polarizer 211 and second polarizer 212), which produces light fluxes polarized in directions perpendicular to each other, is disposed in a position in the vicinity of the diaphragm 220. The light incident on the lens section 200 is therefore divided by the pupil polarizing unit 210 (first polarizer 211 and second polarizer 212) into light corresponding to the right side of the pupil and light corresponding to the left side of the pupil. Using the distance between the centers of gravity of the areas of the light fluxes passing through the right and left sides of the pupil (pass-through figures) as the base line length of binocular parallax, the imaging device polarizing unit 150 (third polarizer 151 and fourth polarizer 152) disposed in the position of the imaging device 140 produces an image for right vision and an image for left vision separately, and the imaging device 140 captures the images simultaneously.

An imaging apparatus for producing stereoscopic images can be provided by disposing the polarizing elements in the lens section 200 and over the imaging device 140 as described above. The polarizers arranged over the imaging device 140 (imaging device polarizing unit 150) are formed in a process of manufacturing the imaging device 140. The polarizers disposed in the lens section 200 (pupil polarizing unit 210) are incorporated in the vicinity of the diaphragm 220 in a process of manufacturing the lens section 200 (lens unit). However, since a lens unit of related art includes no polarizing element, it is necessary to provide a lens unit having a space in which polarizers are disposed.

In particular, to allow the polarizers (pupil polarizing unit 210) to be inserted and removed into and from the lens section 200, it is necessary to provide a relatively wide space on both sides of the polarizers in the optical axis direction that allows the insertion and removal of the polarizers. When a lens unit is accommodated in a mobile phone, a mobile PC, or any other compact information terminal, the lens unit needs to be very small, and provision of a space for the polarizers is therefore very important.

A description will now be made of necessary conditions on the lens section 200 in a case where the imaging apparatus 100 is accommodated in a compact information terminal (mobile phone and mobile PC, for example).

To accommodate the imaging apparatus 100 in a compact information terminal, the lens section 200 desirably satisfies the following points (a) to (d).

(a) The base line length is long.

(b) A space of a reasonable size can be provided on both sides of the diaphragm in the optical axis direction. It is typically essential that polarizers can be placed in the vicinity of the diaphragm (diaphragm unit). The polarizers are desirably detachable.

(c) Light is incident on the imaging device at an angle as close as possible to the right angle even in a high image-height position.

(d) A space that allows a lens to move is provided to achieve autofocus capability.

A lens that satisfies the points (a) to (d) described above is optimum for stereoscopic vision.

The configuration of the lens section 200 (lens unit) in the first embodiment of the present technology will next be described.

[Example of Configuration of Lens Section]

FIG. 4 is a diagrammatic view showing an example of the configuration of the lens section 200 in the first embodiment of the present technology.

FIG. 4 shows an example of how a lens unit (lens section 200) combined with a 1/2.3-inch, 12-megapixel CMOS sensor having pixels arranged at 1.55-μm intervals is designed. The CMOS sensor of the same size is used also in second to fourth embodiments of the present technology, which will be described later.

The shape of an aspheric surface of a aspheric lens shown in each of the embodiments of the present technology is defined by the following expression 1:

$$X = \frac{cy^2}{1+\sqrt{1-(1+K)c^2y^2}} + Ay^4 + By^6 + Cy^8 + Dy^{10} + Ey^{12} + Fy^{14} \quad \text{Expression 1}$$

In Expression 1, X represents the distance from a plane tangential to the aspheric surface at the vertex thereof to a coordinate thereon, y represents the height from the optical axis, c represents the curvature (1/r) at the vertex of the aspheric surface, K represents a conic constant, and A, B, C, D, E, and F represent aspheric coefficients.

FIG. 4 shows the components of the lens section 200, the first lens group 230, the pupil polarizing unit 210, the diaphragm 220, and the second lens group 240 disposed in this order from the object side (left side in FIG. 4). FIG. 4 also shows a cover glass plate 250, which protects the imaging device 140 from dust and other dirt, and an imaging device surface 141 of the imaging device 140. Since the pupil polarizing unit 210 and the diaphragm 220 have been described with reference to FIGS. 1 to 3, the first lens group 230 and the second lens group 240 will be described below.

The first lens group 230 collects light incident on the pupil polarizing unit 210 and the diaphragm 220 and is located on the object side of the pupil polarizing unit 210. In the first embodiment of the present technology, the first lens group 230 is formed only of a single lens (lens 231).

The second lens group 240 focuses subject light having passed through the pupil polarizing unit 210 and the diaphragm 220 on the imaging device 140 and is located on the imaging device side of the diaphragm 220. In the first embodiment of the present technology, the second lens group 240 is formed of three lenses, a second-group first lens 241, a second-group second lens 242, and a second-group third lens 243 arranged in this order from the side where the diaphragm 220 is present.

The first lens group 230 and the second lens group 240 in the first embodiment of the present technology shown in FIG. 4 are configured to satisfy the following Expressions 2 to 7.

$$3.3 \leq f \leq 100 \quad \text{Expression 2}$$

$$-\infty \leq f_{Lg230}/f \leq -0.3 \quad \text{Expression 3}$$

$$0.3 \leq f_{Lg240}/f \leq 10 \quad \text{Expression 4}$$

$$6 \leq \theta h \leq 50 \quad \text{Expression 5}$$

$$0.3 \leq f_{L241}/f \leq 2 \quad \text{Expression 6}$$

$$0.5 \leq f_{L243}/f \leq 2 \quad \text{Expression 7}$$

In the Expressions 2 to 7, f represents the focal length of the entire optical system of the lens section 200, $f_{Lg230}$ represents the focal length of the first lens group 230, $f_{Lg240}$ represents the focal length of the second lens group 240, $f_{L241}$ represents the focal length of the second-group first lens 241, $f_{L243}$ represents the focal length of the second-group third lens 243, and θh represents a horizontal viewing angle. The focal length $f_{L241}$ is an example of the focal length of the first lens set forth in the appended claims, and the focal length $f_{L243}$ is an example of the focal length of the second lens set forth in the appended claims.

A description will now be made of the conditions on the optical system defined by Expressions 2 to 7.

Expression 2 described above is a condition necessary to produce stereoscopic images. To produce stereoscopic images having a large amount of parallax (providing strong stereoscopic sensation), it is necessary to increase the base line length (see BL1 in FIG. 2A) having been described with reference to FIG. 2A. The base line length BL is determined by the following Expression 8.

$$BL = 8r/3\pi \quad \text{Expression 8}$$

In Expression 8, r represents the radius of the pupil and BL represent the base line length. The radius of the pupil r depends on the focal length (f) of the entire optical system and the f-number (F) thereof, the relationship among which is expressed by the following Expression 9

$$2r = f/F \quad \text{Expression 9}$$

That is, Expressions 8 and 9 can be used to derive the following Expression 10, which defines the relationship among the base line length BL, the focal length f of the entire optical system, and the f-number F thereof.

$$BL = 4f/3\pi F \quad \text{Expression 10}$$

Empirically, the base line length BL is desirably greater than (greater than or equal to) "1.0 mm" in order to produce stereoscopic images by using a lens unit in a compact information terminal.

For example, to achieve a base line length greater than or equal to "1.0" based on a lens unit having an f-number of 1.4, the focal length needs to be at least "3.3 mm." At present, since the smallest f-number conceivable as a practical f-number of a lens unit in a camera accommodated in a compact information terminal is "1.4", the lower limit of the focal length of the entire optical system is set at "3.3 mm" (see Expression 2).

When the focal length increases, the characteristics of the lens unit approach those of a telescopic lens used to image a far point. A telescopic lens, which does not provide a large difference in size between a near subject and a far subject (provides poor perspective), is not suitable to produce stereoscopic images. That is, the focal length is preferably set at a reasonably large value, and the upper limit of the focal length of the entire optical system is roughly set at a value that provides perspective (telescopic function) large enough to produce stereoscopic images. The upper limit of the focal length of the lens in the embodiment of the present technology is set at "100 mm" (see Expression 2).

Expression 3 described above shows a condition on the first lens group 230. The condition is necessary for a retrofocus lens appropriate to produce stereoscopic images. In the first embodiment of the present technology, the first lens group 230 is assumed to be a negative retrofocus lens group (including a lens similar thereto). When the lens section 200 is configured to be a retrofocus lens, the position of the exit pupil can be shifted toward the object side, whereby a large pupil diameter can be obtained. When the pupil diameter is large, the base line length becomes long. Further, when the position of the exit pupil is shifted toward the object side, the angle of incidence of subject light incident on a pixel located in a high image-height position in the imaging device can be reduced (can approach the angle of incidence of subject light incident on a pixel on the optical axis), and the angle of incidence of the subject light incident on the diaphragm can also be reduced. Further, when the lens section 200 is configured to be a retrofocus lens, the back focal distance can be increased, and decrease in the amount of light at the periphery can be reduced. That is, the advantages described above correspond to satisfying the points (a) to (d) described above, whereby a lens suitable to produce stereoscopic images can be provided.

When $f_{Lg230}/f$ in Expression 3 described above is smaller than the lower limit, the negative power (refracting power) of the first lens group 230 becomes too low, and in this case, the advantages of a retrofocus lens described above may not be obtained. On the other hand, when $f_{Lg230}/f$ in Expression 3 described above is greater than the upper limit, the negative power (refracting power) becomes too high, and the positive power of the second lens group 240 needs to be high accordingly (because aberrations need to be corrected, for example). As a result, precisely manufactured lenses need to be combined (manufacturing tolerances become small), and manufacturing such lenses may not be realistic. The condition on the first lens group 230 defined by Expression 3 described above is therefore necessary for a retrofocus lens suitable to produce stereoscopic images.

Expression 4 described above shows a condition on the second lens group 240. The condition is necessary to correct optical distortion, asymmetric aberrations, and other aberrations. When the first lens group 230 is configured to have high negative power (refracting power), optical distortion, asymmetric aberrations, and other aberrations are produced. To correct them, the second lens group 240 needs to have positive power. When $f_{Lg240}/f$ in Expression 4 described above is smaller than the lower limit, the positive power becomes too high, manufacture tolerances become too small, and manufacturing such a lens group is unrealistic. On the other hand, when $f_{Lg240}/f$ in Expression 4 described above is greater than the upper limit, the positive power becomes too low, and optical distortion and asymmetric aberrations may not be corrected. In this case, desirable camera characteristics may not be achieved. The condition on the second lens group 240 expressed by Expression 4 described above is therefore necessary for a retrofocus lens suitable to produce stereoscopic images.

Expression 5 described above shows a condition on the horizontal viewing angle (from the left end of a frame to the right end thereof) of the lens section 200. The condition is necessary to narrow the condition defined by Expression 2 described above so as to configure the lens section 200 not to be a telescopic lens but to be a retrofocus lens. The lower limit in Expression 5 described above is a horizontal viewing angle corresponding to a reasonably long focal length (6°) described in Expression 2. The upper limit in Expression 5 described above is a horizontal viewing angle, obtained when a 1/2.33-inch imaging device is used, the base line length is set at 1.0 mm, and the focal length is minimized (50°).

Expression 6 shows a condition on the second-group first lens 241. The condition is necessary to appropriately correct optical distortion, asymmetric aberrations, and other aberrations. The second lens group 240 has positive power as indicated by Expression 4 described above, and it is particularly necessary to set the positive power of the lens in the second lens group that is closest to the first lens group 230 (second-group first lens 241). When the positive power of the second-group first lens 241 is smaller than the lower limit in Expression 6 described above, the positive power becomes too high and hence the manufacture tolerances become very small, resulting in unrealistic manufacturing of such a lens. On the other hand, when the positive power is greater than the upper limit in Expression 6 described above, the positive power becomes too low and optical distortion and asymmetric aberrations may not be corrected. In this case, desirable camera characteristics may not be achieved. The condition on the second-group first lens 241 defined by Expression 6 described above is therefore necessary for a retrofocus lens suitable to produce stereoscopic images.

Expression 7 described above shows a condition on the second-group third lens 243. The second lens group 240 has a triplet structure formed of a positive lens, a negative lens, and a positive lens. In this structure, the second-group third lens 243 primarily plays a role of focusing subject light on the image plane. An ideal condition on the second-group third lens 243 is that the focal length of the second-group third lens 243 ($f_{L243}$) is equal to the focal length of the entire optical system (focal length f).

The lower limit in Expression 7 described above applies to a case where the optical path length of the entire optical system is shortened so that the negative power of the first lens group 230 becomes low. In this case, the positive power of the second-group first lens 241 decreases as the negative power of the first lens group 230 decreases. When the positive power of the second-group first lens 241 decreases, distortion is corrected but astigmatism is not corrected. In this case, astigmatism can be corrected by increasing the power of the second-group third lens 243. The lower limit in Expression 7 described above more specifically applies to a case where the negative power of the first lens group 230 is minimized and approaches the lower limit in Expression 3, which is "−∞". The lower limit in Expression 7 is the condition on the second-group third lens 243 set in the case described above.

The upper limit in Expression 7 described above applies to a case where distortion is sufficiently corrected by the lens in the first lens group 230. In this case, the second lens group 240 is so designed that the power of each of the lenses in the second lens group 240 is low for maximum eccentricity tolerances. The upper limit in Expression 7 is the condition on the second-group third lens 243 set in the case described above.

An example of the first embodiment of the present technology into which specific values are substituted (Numerical Example 1) will be next described.

In Numerical Example 1, the following values are substituted into the parameters in the conditions defined by Expressions 2 to 7 described above.

tables showing the aspheric coefficients, "E-i" represents exponential notation using a base of 10 ($10^{-i}$). For example, "−0.749E−03" represents "−0.749×$10^{-3}$."

TABLE 2

| | | | | | |
|---|---|---|---|---|---|
| Second surface | K: 0.196 | A: −0.749E−03 | B: 0.876E−04 | C: −0.768E−04 | D: 0.1223E−04 |
| Fifth surface | K: −1.000 | A: −0.270E−02 | B: −0.949E−04 | C: 0.360E−04 | D: −0.197E−06 |
| Sixth surface | K: 0.018 | A: −0.546E−02 | B: 0.230E−03 | C: 0.925E−05 | D: 0.233E−05 |
| Seventh surface | K: −1.000 | A: 0.277E−01 | B: −0.171E−02 | C: 0.544E−04 | D: 0.566E−08 |
| Eighth surface | K: −0.776 | A: 0.134E−01 | B: −0.689E−04 | C: −0.507E−04 | D: 0.237E−05 |
| Ninth surface | K: −0.514 | A: −0.327E−02 | B: 0.231E−03 | C: −0.116E−04 | D: 0.265E−06 |
| Tenth surface | K: −0.048 | A: −0.900E−03 | B: 0.109E−03 | C: −0.419E−05 | D: 0.111E−06 |

$f=10.3$ mm $f_{Lg230}/f=-4.2$ $f_{Lg240}/f=0.82$ $\theta h=34°$ $f_{L241}/f=0.67$ $f_{L243}/f=0.65$ Table 1 shows lens data in Numerical Example 1 in which specific values are substituted into the first embodiment of the present technology. In Table 1 and tables showing other lens data, "surface number" denotes the number of the surface counted from the object side, R represents the radius of curvature (mm) of the surface, d represents the distance (mm) between the surface having the surface number and the surface having the following number along the optical axis, nd represents the refractive index of the material of the surface having the surface number at the d line (light having a wavelength of 587.56 nm), and vd represents the Abbe number of the material of the surface having the surface number at the d line.

TABLE 1

| Surface number | R | d | nd | vd |
|---|---|---|---|---|
| 1 | 4.010 | 1.938 | 1.53 | 55.8 |
| 2 | 2.844 | 1.626 | | |
| 3 | INFINITY | 0.300 | 1.52 | 64.2 |
| 4 | INFINITY | 1.027 | | |
| 5 | 6.894 | 1.116 | 1.53 | 55.8 |
| 6 | −7.518 | 2.007 | | |
| 7 | −1.683 | 1.615 | 1.61 | 27.0 |
| 8 | −4.503 | 0.080 | | |
| 9 | 6.190 | 2.798 | 1.53 | 55.8 |
| 10 | −7.058 | 6.000 | | |
| 11 | INFINITY | 0.500 | 1.52 | 64.2 |
| 12 | INFINITY | 0.992 | | |

The image-plane-side surface of the lens 231, both surfaces (object-side and image-plane-side surfaces) of the second-group first lens 241, both surfaces of the second-group second lens 242, and both surfaces of the second-group third lens 243 are aspheric surfaces defined by Expression 1 described above. Table 2 shows the conic constants (K) and the aspheric coefficients (A, B, C, D, E, and F) of the second surface, the fifth to tenth surfaces in Table 1. In Table 2 and the following In Numerical Example 1 shown in Tables 1 and 2, the lens 231 in the lens section 200 is an aspheric plastic lens having an Abbe number vd of "55.8" and a focal length $f_{L231}$ of "−43.5 mm." The second-group first lens 241 is an aspheric plastic lens having an Abbe number vd of "55.8" and a focal length $f_{L241}$ of "6.9 mm." The second-group second lens 242 is an aspheric plastic lens having an Abbe number vd of "27.0" and a focal length $f_{L242}$ of "−5.6 mm." The second-group third lens 243 is an aspheric plastic lens having an Abbe number vd of "55.8" and a focal length $f_{L243}$ of "6.7 mm." As a result, the lens section 200 corresponds to a lens having a focal length f of "10.3 mm," an f-number F of "2.8," a half viewing angle of "20.8°," and a total lens length of "20.0 mm."

Aberrations (spherical aberration, astigmatism, and distortion) produced by the lens section 200 in Numerical Example 1 will next be described with reference to FIGS. 5A to 5C.

[Example of Aberrations Produced by Lens Section]

FIGS. 5A to 5C are aberration diagrams showing the aberrations produced by the lens section 200 in the first embodiment of the present technology. FIGS. 5A to 5C show the aberrations in Numerical Example 1 associated with FIG. 4.

FIG. 5A shows the spherical aberration produced by the lens section 200. In FIG. 5A, the chain line (line L1) represents the spherical aberration at the F line (light having a wavelength of 486.13 nm), the solid line (line L2) represents the spherical aberration at the e line (light having a wavelength of 546.07 nm), and the broken line (line L3) represents the spherical aberration at the d line.

FIG. 5B shows the astigmatism produced by the lens section 200. In FIG. 5B, the solid line (line L4) represents the astigmatism in the direction of the sagittal plane, and the dotted line (line L5) represents the astigmatism in the direction of the meridional plane.

In FIG. 5C, the solid line (line L6) represents the distortion produced by the lens section 200.

As shown in FIGS. 5A and 5B, the lens section 200 is so configured in Numerical Example 1 that the aberrations are well corrected. That is, the lens section 200 provided in Numerical Example 1 is a compact lens unit that has a total lens length of "20.0 mm," is suitable to capture stereoscopic images, and has the aberrations well corrected.

As described above, according to the first embodiment of the present technology, a compact lens unit having a space for polarizers can be manufactured.

<2. Second Embodiment>

In the first embodiment of the present technology, as an example of the lens section 200 (see FIG. 4) that satisfies the conditions defined by Expressions 2 to 7 described above, Numerical Example 1 using the values in Tables 1 and 2 has been described. Numerical Example 1 is an example of the lens section 200 that satisfies Expressions 2 to 7, and there are a variety of other conceivable examples.

Second and third embodiments of the present technology will be described with reference to Numerical Examples 2 and 3.

[Example of Configuration of Lens Section]

FIG. 6 is a diagrammatic view showing an example of the configuration of a lens section in the second embodiment of the present technology.

It is assumed that the conditions defined by Expressions 2 to 7 described in association with FIG. 4 are also satisfied in the second embodiment of the present technology shown in FIG. 6.

FIG. 6 shows the components of the lens section in the second embodiment of the present technology, a first lens group 330, a pupil polarizing unit 210, a diaphragm 220, a second lens group 340, a cover glass plate 250, and an imaging device surface 141 disposed in this order from the object side (left side in FIG. 6). The pupil polarizing unit 210, the diaphragm 220, the cover glass plate 250, and the imaging device surface 141 are the same as those described with reference to FIG. 4, and the first lens group 330 and the second lens group 340 will therefore be described below.

The first lens group 330 is located on the object side of the pupil polarizing unit 210, as in the case of the first lens group 230 shown in FIG. 4. The first lens group 330 is formed of a single lens (lens 331).

The second lens group 340 is located on the image plane side (imaging device side) of the diaphragm 220, as in the case of the second lens group 240 shown in FIG. 4. The second lens group 340 is formed of three lenses, a second-group first lens 341, a second-group second lens 342, and a second-group third lens 343 arranged in this order from the side where the diaphragm 220 is present.

An example of the second embodiment of the present technology into which specific values are substituted (Numerical Example 2) will be next described.

In Numerical Example 2, the following values are substituted into the parameters in the conditions defined by Expressions 2 to 7 described above.

$f = 10.3$ mm $f_{Lg330}/f = -0.83$ $f_{Lg340}/f = 0.83$ $\theta h = 34°$ $f_{L341}/f = 0.69$ $f_{L343}/f = 1.04$ Table 3 shows lens data in Numerical Example 2 in which specific values are substituted into the second embodiment of the present technology.

TABLE 3

| Surface number | R | d | nd | vd |
| --- | --- | --- | --- | --- |
| 1 | 1500.0 | 0.600 | 1.53 | 55.8 |
| 2 | 4.682 | 3.207 | | |
| 3 | INFINITY | 0.300 | 1.52 | 64.2 |
| 4 | INFINITY | 1.602 | | |
| 5 | 7.876 | 1.993 | 1.53 | 55.8 |
| 6 | -6.820 | 3.151 | | |
| 7 | -17.833 | 0.600 | 1.64 | 24.0 |
| 8 | 8.627 | 0.989 | | |
| 9 | 79.991 | 1.106 | 1.53 | 55.8 |
| 10 | -6.243 | 7.000 | | |
| 11 | INFINITY | 0.500 | 1.52 | 64.2 |
| 12 | INFINITY | 5.453 | | |

Table 4 shows the conic constants (K) and the aspheric coefficients (A, B, C, D, E, and F) of aspheric surfaces of aspheric lenses, as in Table 2 associated with FIG. 4. In the second embodiment of the present technology, the image-plane-side surface of the lens 331, both surfaces of the second-group first lens 341, both surfaces of the second-group second lens 342, and both surfaces of the second-group third lens 343 are aspheric surfaces defined by Expression 1 described above.

TABLE 4

| | | | | | |
| --- | --- | --- | --- | --- | --- |
| Second surface | K: 0.0710 | A: -0.136E-03 | B: 0.572E-05 | C: -0.761E-06 | D: 0.475E-07 |
| Fifth surface | K: -1.000 | A: -0.447E-03 | B: -0.560E-05 | C: -0.602E-06 | D: 0.256E-07 |
| Sixth surface | K: -1.000 | A: 0.196E-03 | B: -0.176E-04 | C: -0.2459E-06 | D: 0192E-07 |
| Seventh surface | K: -1.000 | A: 0.433E-03 | B: -0.300E-05 | C: -0.286E-06 | D: 0.192E-06 |
| Eighth surface | K: 0.0325 | A: -0.137E-03 | B: 0.919E-05 | C: 0.654E-06 | D: 0.441E-07 |
| Ninth surface | K: -1.000 | A: -0.167E-03 | B: -0.164E-05 | C: 0.135E-05 | D: -0.462E-07 |
| Tenth surface | K: -0.770 | A: 0.378E-04 | B: 0.248E-05 | C: -0.112E-06 | D: 0.550E-07 |

In Numerical Example 2 shown in Tables 3 and 4, the lens 331 is an aspheric plastic lens having an Abbe number vd of "55.8" and a focal length $f_{L331}$ of "-8.8 mm." The second-group first lens 341 is an aspheric plastic lens having an Abbe number vd of "55.8" and a focal length $f_{L341}$ of "7.2 mm." The second-group second lens 342 is an aspheric plastic lens having an Abbe number vd of "24.0" and a focal length $f_{L342}$ of "-9.0 mm." The second-group third lens 343 is an aspheric plastic lens having an Abbe number vd of "55.8" and a focal length $f_{L343}$ of "10.9 mm."

As a result, the lens section in Numerical Example 2 corresponds to a lens having a focal length f of "10.5 mm," an f-number F of "2.8," a half viewing angle of "20.9°," and a total lens length of "26.5 mm."

Aberrations (spherical aberration, astigmatism, and distortion) produced by the lens section in Numerical Example 2 will next be described with reference to FIGS. 7A to 7C.

[Example of Aberrations Produced by Lens Section]

FIGS. 7A to 7C are aberration diagrams showing the aberrations produced by the lens section in the second embodiment of the present technology.

FIGS. 7A to 7C correspond to FIGS. 5A to 5C, respectively, and no description thereof will therefore be made in detail.

As shown in FIGS. 7A and 7B, the lens section in the second embodiment of the present technology is so configured in Numerical Example 2 that the aberrations are well corrected.

As described above, according to the second embodiment of the present technology, a compact lens unit having a space for polarizers can be manufactured as well.

<3. Third Embodiment>

A third embodiment of the present technology will next be described with reference to Numerical Example 3.

[Example of Configuration of Lens Section]

FIG. 8 is a diagrammatic view showing an example of the configuration of a lens section in the third embodiment of the present technology.

It is assumed that the conditions defined by Expressions 2 to 7 described in association with FIG. 4 are also satisfied in the third embodiment of the present technology shown in FIG. 8.

The lens section according to the third embodiment of the present technology shown in FIG. 8 includes a first lens group 430 and a second lens group 440 instead of the first lens group 230 and the second lens group 240 shown in FIG. 4. The components other than the first lens group 430 and the second lens group 440 are the same as those shown in FIG. 4, and the first lens group 430 and the second lens group 440 will therefore be described below.

The first lens group 430 is located on the object side of the pupil polarizing unit 210, as in the case of the first lens group 230 shown in FIG. 4. The first lens group 430 is formed two lenses, a first-group first lens 431 and a first-group second lens 432 arranged in this order from the object side.

The second lens group 440 is located on the image plane side of the diaphragm 220, as in the case of the second lens group 240 shown in FIG. 4. The second lens group 440 is formed of three lenses, a second-group first lens 441, a second-group second lens 442, and a second-group third lens 443 arranged in this order from the side where the diaphragm 220 is present.

An example of the third embodiment of the present technology into which specific values are substituted (Numerical Example 3) will be next described.

In Numerical Example 3, the following values are substituted into the parameters in the conditions defined by Expressions 2 to 7 described above.

$f = 10.5$ mm $f_{Lg430}/f = -2.76$ $f_{Lg440}/f = 1.15$ $\theta h = 34°$ $f_{L441}/f = 0.55$ $f_{L443}/f = 1.41$ Table 5 shows lens data in Numerical Example 3 in which specific values are substituted into the third embodiment of the present technology.

TABLE 5

| Surface Number | R | d | nd | vd |
|---|---|---|---|---|
| 1 | −161.3 | 0.600 | 1.53 | 55.8 |
| 2 | 7.581 | 3.596 | | |
| 3 | −5.814 | 1.200 | 1.61 | 27.0 |
| 4 | −5.043 | 1.000 | | |
| 5 | INFINITY | 0.300 | 1.52 | 64.2 |
| 6 | INFINITY | 1.500 | | |
| 7 | 5.722 | 2.219 | 1.53 | 55.8 |
| 8 | −5.806 | 0.774 | | |
| 9 | −9.461 | 0.644 | 1.61 | 27.0 |
| 10 | 5.285 | 2.250 | | |
| 11 | −28.253 | 1.012 | 1.53 | 55.8 |
| 12 | −6.229 | 7.000 | | |
| 13 | INFINITY | 0.500 | 1.52 | 64.2 |
| 14 | INFINITY | 3.907 | | |

Table 6 shows the conic constants (K) and the aspheric coefficients (A and B) of aspheric surfaces of aspheric lenses, as in Table 2 associated with FIG. 4. In the third embodiment of the present technology, both surfaces of the first-group second lens 432, both surfaces of the second-group first lens 441, both surfaces of the second-group second lens 442, and both surfaces of the second-group third lens 443 are aspheric surfaces defined by Expression 1 described above.

TABLE 6

| | | | |
|---|---|---|---|
| Third surface | K: 0.895 | A: 0.000E+00 | B: 0.106E−03 |
| Fourth surface | K: 0.226 | A: 0.629E−03 | B: 0.885E−04 |
| Seventh surface | K: −0.790 | A: −0.163E−03 | B: 0.262E−04 |
| Eighth surface | K: −1.000 | A: 0.189E−02 | B: −0.222E−04 |
| Ninth surface | K: −1.000 | A: 0.239E−02 | B: −0.758E−04 |
| Tenth surface | K: 0.591 | A: −0.493E−03 | B: −0.401E−04 |
| Eleventh surface | K: 1.000 | A: −0.131E−03 | B: 0.832E−05 |
| Twelfth surface | K: −0.718 | A: −0.217E−04 | B: 0.445E−05 |

In Numerical Example 3 shown in Tables 5 and 6, the first-group first lens 431 is an aspheric plastic lens having an Abbe number vd of "55.8" and a focal length $f_{L431}$ of "−13.6 mm." The first-group second lens 432 is an aspheric plastic lens having an Abbe number vd of "27.0" and a focal length $f_{L432}$ of "39.0 mm." The second-group first lens 441 is an aspheric plastic lens having an Abbe number vd of "55.8" and a focal length $f_{L441}$ of "5.8 mm." The second-group second lens 442 is an aspheric plastic lens having an Abbe number vd of "27.0" and a focal length $f_{L442}$ of "−5.4 mm." The second-group third lens 443 is an aspheric plastic lens having an Abbe number vd of "55.8" and a focal length $f_{L443}$ of "14.8 mm."

As a result, the lens section in the third embodiment of the present technology corresponds to a lens having a focal length f of "10.5 mm," an f-number F of "2.8," a half viewing angle of "20.9°," and a total lens length of "26.5 mm."

Aberrations (spherical aberration, astigmatism, and distortion) produced by the lens section in Numerical Example 3 will next be described with reference to FIGS. 9A to 9C.

[Example of Aberrations Produced by Lens Section]

FIGS. 9A to 9C are aberration diagrams showing the aberrations produced by the lens section in the third embodiment of the present technology.

FIGS. 9A to 9C correspond to FIGS. 5A to 5C, respectively, and no description thereof will therefore be made in detail.

As shown in FIGS. 9A and 9B, the lens section provided in Numerical Example 3 is a compact lens unit that is suitable to capture stereoscopic images and has the aberrations well corrected.

As described above, according to the third embodiment of the present technology, a compact lens unit having a space for polarizers can be manufactured as well.

According to the first to third embodiments of the present technology, the pupil diameter and hence the base line length can be increased. That is, stereoscopic images (3D images) that provide a strong stereoscopic sensation can be captured.

Further, according to the first to third embodiments of the present technology, a large space can be provided in the vicinity of the diaphragm, whereby the pupil polarizing unit 210 can be inserted and removed into and from the space. That is, the pupil polarizing unit 210 is removed when a planar image (2D image) is captured, whereas the pupil polarizing unit 210 is inserted when 3D images are captured, whereby the imaging apparatus that can capture not only a 2D image but also 3D images can be produced.

Moreover, according to the first to third embodiments of the present technology, the angle of incidence of the principal ray incident on the diaphragm 220 can be reduced, and the angle of incidence of the principal ray incident on the imaging device 140 can be reduced. That is, since the angles of incidence of the principal ray incident on the pupil polarizing unit 210 and the imaging device polarizing unit 150 are reduced, the polarizing elements can be readily designed (manufacturing tolerances increase).

Further, according to the first to third embodiments of the present technology, autofocusing can be performed by driving a predetermined lens in the second lens group. Since the lens driven in an autofocusing process is separate from the pupil polarizing unit 210, a mechanism that inserts and removes the pupil polarizing unit 210 can be separate from an autofocusing mechanism, whereby the mechanical structure can be simplified.

<4. Fourth Embodiment>

The first to third embodiments of the present technology have been described with reference to the case where the first lens group has negative power. When the first lens group has negative power, the angle of incidence of subject light incident on the pupil polarizing unit 210 can be particularly reduced, whereby the polarizers provided in the pupil polarizing unit 210 can be readily designed. When the polarizers provided in the pupil polarizing unit 210 have high performance, and hence a large angle of incidence does not raise a problem, the first lens group can be configured to have positive power. When the first lens group has positive power, for example, a more compact lens unit can be readily designed.

In a fourth embodiment of the present technology, a case where the first lens group has positive power will be described with reference to FIGS. 10 and 11A to 11C.

[Example of Configuration of Lens Section]

Figure 10:
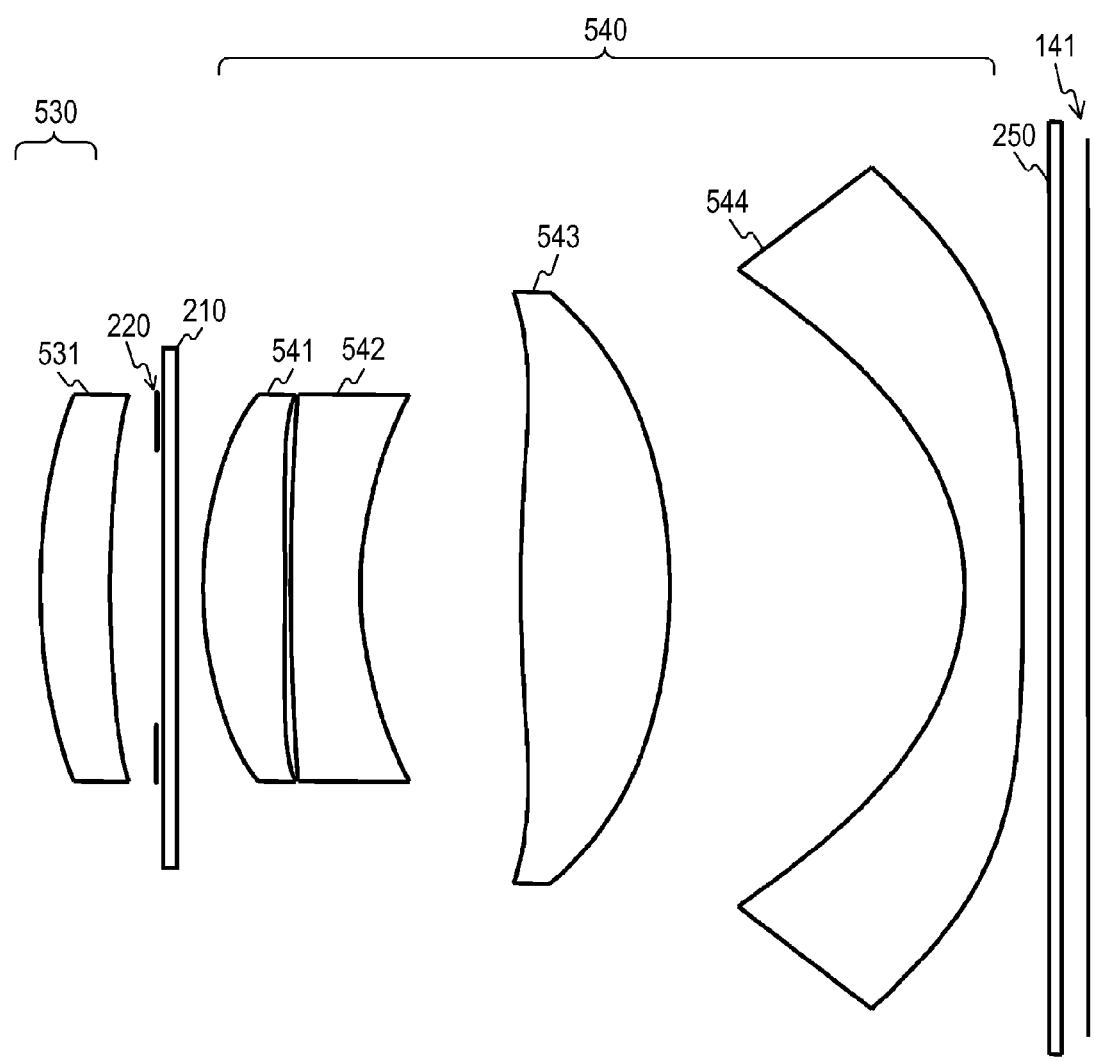
FIG. 10 is a diagrammatic view showing an example of the configuration of a lens section in a fourth embodiment of the present technology.

FIG. 10 is a diagrammatic view showing an example of the configuration of a lens section in the fourth embodiment of the present technology.

It is assumed that the condition defined by Expression 2 out of Expressions 2 to 7 described in association with FIG. 4 is satisfied in the fourth embodiment of the present technology shown in FIG. 10.

The lens section according to the fourth embodiment of the present technology shown in FIG. 10 includes a first lens group 530 and a second lens group 540 instead of the first lens group 230 and the second lens group 240 shown in FIG. 4. The lens section according to the fourth embodiment of the present technology shown in FIG. 10 further includes the pupil polarizing unit 210 on the image plane side (imaging device side) of the diaphragm 220. The positional relationship between the pupil polarizing unit 210 and the diaphragm 220 and the components other than the first lens group 530 and the second lens group 540 are the same as those shown in FIG. 4, and the first lens group 530 and the second lens group 540 will therefore be described below.

The first lens group 530 is located on the object side (subject side) of the pupil polarizing unit 210, as in the case of the first lens group 230 shown in FIG. 4. The first lens group 530 is formed a single lens (lens 531).

The second lens group 540 is located on the image plane side of the diaphragm 220, as in the case of the second lens group 240 shown in FIG. 4. The second lens group 540 is formed of four lenses, a second-group first lens 541, a second-group second lens 542, a second-group third lens 543, and a second-group fourth lens 544 arranged in this order from the side where the diaphragm 220 (pupil polarizing unit 210) is present.

The first lens group 530 and the second lens group 540 according to the fourth embodiment of the present technology shown in FIG. 10 are configured to satisfy Expression 2 described in association with FIG. 4 and the following Expression 11 showing a condition on the lens 531.

$$3.3 \leq f \leq 100 \quad \text{Expression 2}$$

$$0.66 \leq qL_{531} \leq 100 \quad \text{Expression 11}$$

In Expression 11, $qL_{531}$ represents a bending factor of the lens 531. The bending factor $qL_{531}$ is determined by the following expression 12.

$$qL_{531} = (R_{L531S2} + R_{L531S1})/(R_{L531S2} - R_{L531S1}) \quad \text{Expression 12}$$

In Expression 12, $R_{L531S2}$ represents the radius of curvature of the image-plane-side surface of the lens 531, and $R_{L531S1}$ represents the radius of curvature of the object-side surface of the lens 531. That is, the radius of curvature R of the first surface in Table 7, which will be shown later, is a numerical example of $R_{L531S1}$. Similarly, the radius of curvature R of the second surface in Table 7, which will be shown later, is a numerical example of $R_{L531S2}$.

Expression 2 described above is necessary to increase the base line length so that stereoscopic images can provide a stereoscopic sensation, as described with reference to FIG. 4.

Expression 11 described above is a conditional expression on the bending performed on the lens 531. The lens 531 that satisfies Expression 11 is a positive meniscus lens with its convex shape facing the object side, as shown in FIG. 10. That is, the object-side surface (first surface in Table 7, which will be shown later) and the image-plane-side surface (second surface in Table 7, which will be shown later) of the lens 531 have their centers of radii of curvature located on the diaphragm side. The thus configured lens 531 can eliminate off-axis coma and astigmatism. When $qL_{531}$ in Expression 11 is smaller than the lower limit, no bending can be performed. As a result, off-axis coma or astigmatism may not be eliminated (aberrations become worse). When $qL_{531}$ in Expression 11 is greater than the upper limit, the positive power becomes low, which allows the convex shape to be close to that of a retrofocus lens and hence improves the characteristics of the lens 531, but the total length of the lens 531 disadvantageously increases as compared with the case where bending is performed on the lens 531. When the convex shape is close to that of a retrofocus lens (when $qL_{531}$ in Expression 11 is greater than the upper limit), the configuration based on the conditions shown in any of the first to third embodiments of the present technology (Expressions 2 to 7 described in association with FIG. 4) is most appropriate to capture stereoscopic images.

An example of the fourth embodiment of the present technology into which specific values are substituted (Numerical Example 4) will next be described.

In Numerical Example 4, the following values are substituted into the parameters in the conditions defined by Expressions 2 and 11 described above.

$f=7.1$ mm $qL_{531}=3.0$

Table 7 shows lens data in Numerical Example 4 in which specific values are substituted into the fourth embodiment of the present technology.

TABLE 7

| Surface number | R | d | nd | vd |
|---|---|---|---|---|
| 1 | 5.327 | 0.600 | 1.53 | 55.8 |
| 2 | 10.794 | 0.400 | | |
| 3 | INFINITY | 0.100 | | |
| 4 | INFINITY | 0.300 | 1.52 | 64.2 |
| 5 | 3.714 | 0.700 | 1.53 | 55.8 |
| 6 | −79.188 | 0.050 | | |
| 7 | 14.067 | 0.600 | 1.61 | 27.0 |
| 8 | 3.092 | 1.375 | | |
| 9 | 11.512 | 1.282 | 1.53 | 55.8 |
| 10 | −4.888 | 2.535 | | |
| 11 | −2.261 | 0.503 | 1.53 | 55.8 |
| 12 | −36.736 | 0.223 | | |
| 13 | INFINITY | 0.109 | 1.52 | 64.2 |
| 14 | INFINITY | 0.223 | | |

Table 8 shows the conic constants (K) and the aspheric coefficients (A, B, C, D, E, and F) of aspheric surfaces of aspheric lenses, as in Table 2 associated with FIG. 4. In the fourth embodiment of the present technology, both surfaces of the lens 531, both surfaces of the second-group first lens 541, both surfaces of the second-group second lens 542, both surfaces of the second-group third lens 543, and both surfaces of the second-group fourth lens 544 are aspheric surfaces defined by Expression 1 described above.

TABLE 8

| | | | | | |
|---|---|---|---|---|---|
| First surface | K: 0.550 | A: −0.171E−02 | B: 0.236E−03 | C: 0.398E−04 | D: 0.566E−04 |
| Second surface | K: 0.779 | A: −0.177E−02 | B: 0.247E−04 | C: 0.403E−03 | D: 0.474E−04 |
| Fifth surface | K: −0.275 | A: 0.473E−02 | B: −0.255E−02 | C: 0.128E−02 | D: −0.717E−05 |
| Sixth surface | K: 1.000 | A: 0.628E−02 | B: −0.112E−02 | C: 0.591E−03 | D: 0.214E−03 |
| Seventh surface | K: −1.000 | A: −0.201E−01 | B: 0.996E−02 | C: −0.232E−02 | D: 0.264E−03 |
| Eighth surface | K: −1.000 | A: −0.230E−01 | B: 0.116E−01 | C: −0.278E−02 | D: 0.297E−03 |
| Ninth surface | K: −1.000 | A: −0.665E−02 | B: −0.245E−03 | C: 0.115E−04 | D: 0.798E−07 |
| Tenth surface | K: 0.316 | A: −0.260E−02 | B: −0.548E−03 | C: 0.151E−04 | D: −0.338E−07 |
| Eleventh surface | K: −0.774 | A: −0.329E−02 | B: 0.270E−03 | C: −0.148E−04 | D: 0.341E−05 |
| Twelfth surface | K: 1.000 | A: −0.601E−02 | B: −0.170E−03 | C: 0.101E−04 | D: 0.198E−06 |

In Numerical Example 4 shown in Tables 7 and 8, the lens section includes a positive meniscus lens with its convex shape facing the object side (lens 531), the diaphragm 220, the pupil polarizing unit 210, and a lens having positive power (second-group first lens 541). The second-group first lens 541 is followed by a lens having negative power (second-group second lens 542), a lens having positive power (second-group third lens 543), and a lens having negative power (second-group fourth lens 544). The lens 531, when it has a meniscus shape, has its center of the radius of curvature located on the diaphragm side, whereby off-axis coma and astigmatism can be reduced. Further, the configuration in which the lens 531 is followed by the diaphragm 220 is most appropriate to shift the position of the pupil forward (toward subject). When the position of the pupil is shifted forward, the angles of incidence of light rays incident on the imaging device can be reduced. The structure in which the diaphragm 220 is disposed between the first lens group 530 and the second lens group 540, which is what is called an intra-diaphragm structure, is advantageous in correcting aberrations of the entire lens (aberrations produced by the lens section).

In the Numerical Example 4, the second-group first lens 541, which has positive power and a large Abbe number, is combined with the second-group second lens 542, which has negative power and a small Abbe number, to correct chromatic aberrations in a satisfactory manner. Further, the thus combined lenses allow the effective diameter thereof to increase and the optical positions of the second-group third lens 543 and the second-group fourth lens 544 to approach the diaphragm 220.

In Numerical Example 4, the optical position of the image-plane-side surface of the second-group third lens 543 and the optical position of the object-side surface of the second-group fourth lens 544 approach the diaphragm 220, whereby off-axis coma and astigmatism can be reduced.

The thus configured lens section can correct aberrations in a very satisfactory manner, whereby satisfactory camera characteristics are achieved. Further, since all the lenses are made of plastic materials, the lens section can be manufactured at low cost.

As a result, the lens section in Numerical Example 4 corresponds to a lens having a focal length f of "7.1 mm," an f-number F of "2.8," a half viewing angle of "29.0°," and a total lens length of "9.0 mm." That is, a very compact stereoscopic image capturing camera (3D camera) can be manufactured, as compared to a camera including any of the lens sections having the total length of "26.5 mm" shown in Numerical Examples 1 to 3.

Aberrations (spherical aberration, astigmatism, and distortion) produced by the lens section in Numerical Example 4 will next be described with reference to FIGS. 11A to 11C.
[Example of Aberrations Produced by Lens Section].

FIGS. 11A to 11C are aberration diagrams showing the aberrations produced by the lens section in the fourth embodiment of the present technology.

FIGS. 11A to 11C correspond to FIGS. 5A to 5C, respectively, and no description thereof will therefore be made in detail.

As shown in FIGS. 11A and 11B, the lens section provided in Numerical Example 4 is a compact lens unit that is suitable to capture stereoscopic images and has the aberrations well corrected.

As described above, according to the fourth embodiment of the present technology, a compact lens unit having a space for polarizers can be manufactured as well.

As described above, according to the fourth embodiment of the present technology, in which the first lens group has positive power, the lens section can be configured to have a very short optical path length. Further, according to the fourth embodiment of the present technology, the pupil diameter and hence the base line length can be increased, as in the first to third embodiments of the present technology. Moreover, since the pupil polarizing unit 210 can be inserted and removed, the imaging apparatus that can capture not only stereoscopic images but also a planar image can be produced.

As described above, according to the embodiments of the present technology, a compact lens section (lens unit) for stereoscopic vision can be provided. Further, according to the embodiments of the present technology, a current camera apparatus for stereoscopic vision, which is complicated and bulky, can be converted into one having substantially the same configuration as that of a camera apparatus of related art for planar (2D) images, whereby a camera for stereoscopic vision that excels in reliability and cost can be manufactured in quantity.

In the first to fourth embodiments of the present technology, it is assumed that only a cover glass plate is disposed between the second lens group and the imaging device, but the component disposed between the second lens group and the imaging device is not limited to a cover glass plate. Other optical members (light attenuating filter, infrared cutoff filter, and lowpass filter, for example) may be disposed between the second lens group and the imaging device.

The first embodiment of the present technology has been described with reference to the case where the pixels in the imaging device 140 are disposed in a Bayer arrangement, but the pixels can be disposed in any other suitable arrangement. For example, an interline arrangement, a G-stripe/RB checker arrangement, a G-stripe/RB complete checker arrangement, a checker complementary color arrangement, a stripe arrangement, an oblique stripe arrangement, a primary color difference arrangement, and a field color difference sequential arrangement can also be used.

The embodiments described above are presented by way of example for embodying the present technology. Items in the embodiments are related to specific subject matters set forth in the appended claims. Similarly, the specific subject matters in the appended claims are related to the items having the same names in the embodiments of the present technology. It is, however, noted that the present technology is not limited to the embodiments but can be embodied with a variety of changes made to the embodiments to the extent that the changes do not depart from the substance of the present technology.

Each of the procedures described in the above embodiments may be taken as a method including a series of processes of the procedure or may be taken as a program that instructs a computer to carry out the series of processes or a recording medium on which the program is recorded. Examples of the recording medium may include a CD (compact disc), an MD (minidisc), a DVD (digital versatile disk), a memory card, and a Blu-ray Disc®.

The present technology can also be configured as follows.
<1> An imaging apparatus including
a first lens group disposed on a subject side of a diaphragm in the vicinity of which two polarizers that polarize light from a subject are disposed, the polarizers being a first polarizer and a second polarizer whose polarization directions are perpendicular to each other,
a second lens group disposed on the side of the diaphragm where an imaging device is present, over a photodetection surface of which a third polarizer and a fourth polarizer are disposed, the third polarizer having a polarization direction parallel to the polarization direction of the first polarizer and the fourth polarizer having a polarization direction parallel to the polarization direction of the second polarizer, and
an image processor that produces stereoscopic images based on image data produced by converting light incident on the imaging device through the first lens group and the second lens group,
wherein the second lens group has positive refracting power, and characteristics of the first lens group and the second lens group satisfy certain conditions.
<2> The imaging apparatus described in <1>, wherein as one of the certain conditions, the focal length of the entire optical system of the imaging apparatus including the first lens group and the second lens group satisfies the following conditional expression (1):

$$3.3 \leq f \leq 100 \tag{1}$$

where f represents the focal length of the entire optical system of the imaging apparatus.
<3> The imaging apparatus described in <2>, wherein a bending factor of a lens that forms the first lens group satisfies the following conditional expression (2):

$$0.66 \leq qL1 \leq 100 \tag{2}$$

where qL1 represents the bending factor of a lens that forms the first lens group.
<4> The imaging apparatus described in <2> or <3>, wherein the focal length of the first lens group satisfies the following conditional expression (3) and the focal length of the second lens group satisfies the following conditional expression (4):

$$-\infty \leq fg1/f \leq -0.3 \tag{3}$$

$$0.3 \leq -fg2/f \leq 10 \tag{4}$$

where fg1 represents the focal length of the first lens group, and fg2 represents the focal length of the second lens group.

<5> The imaging apparatus described in <4>, wherein the second lens group is formed of at least two lenses, and the focal length of a first lens that forms the second lens group and is closest to the subject satisfies the following conditional expression (5) and the focal length of a second lens that forms the second lens group and is closest to the imaging device satisfies the following conditional expression (6):

$$0.3 \leq fL1/f \leq 2 \tag{5}$$

$$0.5 \leq fL2/f \leq 2 \tag{6}$$

where fL1 represents the focal length of the first lens, and fL2 represents the focal length of the second lens.

<6> The imaging apparatus described in any of <2> to <5>, wherein a horizontal viewing angle of the entire optical system of the imaging apparatus including the first lens group and the second lens group satisfies the following conditional expression (7):

$$6 \leq \theta h \leq 50 \tag{7}$$

where θh represents the horizontal viewing angle of the entire optical system of the imaging apparatus.

<7> The imaging apparatus described in any of <1> to <6>, wherein the first polarizer and the second polarizer are disposed adjacent to each other, the first polarizer and the second polarizer connected to each other along a first direction, the imaging device has pixels arranged in the photodetection plane thereof in a matrix identified by the first direction and a second direction perpendicular thereto, and the third polarizer and the fourth polarizer are alternately disposed on an arrangement unit basis, the arrangement unit being a line or lines and the line formed of pixels in the first direction in the imaging device.

<8> The imaging apparatus described in <7>, wherein the first polarizer and the second polarizer are disposed adjacent to each other on opposite sides of the second direction as a boundary.

<9> An electronic apparatus including a first lens group disposed on a subject side of a diaphragm in the vicinity of which two polarizers that polarize light from a subject are disposed, the polarizers being a first polarizer and a second polarizer whose polarization directions are perpendicular to each other, a second lens group disposed on the side of the diaphragm where an imaging device is present, over a photodetection surface of which a third polarizer and a fourth polarizer are disposed, the third polarizer having a polarization direction parallel to the polarization direction of the first polarizer and the fourth polarizer having a polarization direction parallel to the polarization direction of the second polarizer, and an image processor that produces stereoscopic images based on image data produced by converting light incident on the imaging device through the first lens group and the second lens group, wherein the second lens group has positive refracting power, and characteristics of the first lens group and the second lens group satisfy certain conditions.

The present disclosure contains subject matter related to that disclosed in Japanese Priority Patent Application JP 2011-069112 filed in the Japan Patent Office on Mar. 28, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
a first lens group positioned closer to an object side of the imaging apparatus than to an imaging side of the imaging apparatus;
a first polarizer filter including two polarizers that polarize light from a subject, the polarizers being a first polarizer and a second polarizer whose polarization directions are perpendicular to each other;
a second lens group, including three lenses, positioned closer to the imaging side of the imaging apparatus than the object side of the imaging apparatus;
a second polarizer including a third polarizer and a fourth polarizer, the third polarizer having a polarization direction parallel to the polarization direction of the first polarizer and the fourth polarizer having a polarization direction parallel to the polarization direction of the second polarizer;
a diaphragm positioned between the first polarizer and the second lens group, a size of an opening of the diaphragm being configured to change by a driver; and
an image processor that produces stereoscopic images based on image data produced by converting light incident on the imaging device through the first lens group and the second lens group.

2. The imaging apparatus according to claim 1, wherein the focal length of the entire optical system of the imaging apparatus including the first lens group and the second lens group satisfies the following conditional expression (1):

$$3.3 \leq f \leq 100 \tag{1}$$

where f represents the focal length of the entire optical system of the imaging apparatus.

3. The imaging apparatus according to claim 2, wherein a bending factor of a lens that forms the first lens group satisfies the following conditional expression (2):

$$0.66 \leq qL1 \leq 100 \tag{2}$$

where qL1 represents the bending factor of a lens that forms the first lens group.

4. The imaging apparatus according to claim 2, wherein the focal length of the first lens group satisfies the following conditional expression (3) and the focal length of the second lens group satisfies the following conditional expression (4):

$$-\infty \leq fg1/f \leq -0.3 \tag{3}$$

$$0.3 \leq fg2/f \leq 10 \tag{4}$$

where fg1 represents the focal length of the first lens group, and fg2 represents the focal length of the second lens group.

5. The imaging apparatus according to claim 4, wherein the second lens group is formed of at least two lenses, and the focal length of a first lens that forms the second lens group and is closest to the subject satisfies the following conditional expression (5) and the focal length of a second lens that forms the second lens group and is closest to the imaging device satisfies the following conditional expression (6):

$$0.3 \leq fL1/f \leq 2 \tag{5}$$

$$0.5 \leq fL2/f \leq 2 \tag{6}$$

where fL1 represents the focal length of the first lens, and fL2 represents the focal length of the second lens.

6. The imaging apparatus according to claim 2, wherein a horizontal viewing angle of the entire optical system of the imaging apparatus including the first lens group and the second lens group satisfies the following conditional expression (7):

$$6 \leq \theta h \leq 50 \tag{7}$$

where θh represents the horizontal viewing angle of the entire optical system of the imaging apparatus.

7. The imaging apparatus according to claim 1, wherein the first polarizer filter and the second polarizer filter are disposed adjacent to each other, the first polarizer and the second polarizer connected to each other along a first direction,
   the imaging device has pixels arranged in a photodetection plane thereof in a matrix identified by the first direction and a second direction perpendicular thereto, and
   the third polarizer and the fourth polarizer are alternately disposed on an arrangement unit basis, the arrangement unit being a line or lines and the line formed of pixels in the first direction in the imaging device.

8. The imaging apparatus according to claim 7, wherein the first polarizer and the second polarizer are disposed adjacent to each other on opposite sides of the second direction as a boundary.

9. An electronic device, comprising an image apparatus including:
   a first lens group positioned closer to an object side of the imaging apparatus than to an imaging side of the imaging apparatus;
   a first polarizer filter including two polarizers that polarize light from a subject, the polarizers being a first polarizer and a second polarizer whose polarization directions are perpendicular to each other;
   a second lens group, including three lenses, positioned closer to the imaging side of the imaging apparatus than the object side of the imaging apparatus;
   a second polarizer including a third polarizer and a fourth polarizer, the third polarizer having a polarization direction parallel to the polarization direction of the first polarizer and the fourth polarizer having a polarization direction parallel to the polarization direction of the second polarizer;
   a diaphragm positioned between the first polarizer and the second lens group, a size of an opening of the diaphragm being configured to change by a driver; and
   an image processor that produces stereoscopic images based on image data produced by converting light incident on the imaging device through the first lens group and the second lens group, wherein
   the second lens group has positive refracting power.

10. The electronic device according to claim 9, wherein the focal length of the entire optical system of the imaging apparatus including the first lens group and the second lens group satisfies the following conditional expression (1):

$$3.3 \leq f \leq 100 \tag{1}$$

where f represents the focal length of the entire optical system of the imaging apparatus.

11. The electronic device according to claim 10, wherein a bending factor of a lens that forms the first lens group satisfies the following conditional expression (2):

$$0.66 \leq qL1 \leq 100 \tag{2}$$

where qL1 represents the bending factor of a lens that forms the first lens group.

12. The electronic device according to claim 10, wherein the focal length of the first lens group satisfies the following conditional expression (3) and the focal length of the second lens group satisfies the following conditional expression (4):

$$-\infty \leq fg1/f \leq -0.3 \tag{3}$$

$$0.3 \leq fg2/f \leq 10 \tag{4}$$

where fg1 represents the focal length of the first lens group, and fg2 represents the focal length of the second lens group.

13. The electronic device according to claim 12, wherein the second lens group is formed of at least two lenses, and the focal length of a first lens that forms the second lens group and is closest to the subject satisfies the following conditional expression (5) and the focal length of a second lens that forms the second lens group and is closest to the imaging device satisfies the following conditional expression (6):

$$0.3 \leq fL1/f \leq 2 \tag{5}$$

$$0.5 \leq fL2/f \leq 2 \tag{6}$$

where fL1 represents the focal length of the first lens, and fL2 represents the focal length of the second lens.

14. The electronic device according to claim 10, wherein a horizontal viewing angle of the entire optical system of the imaging apparatus including the first lens group and the second lens group satisfies the following conditional expression (7):

$$6 \leq \theta h \leq 50 \tag{7}$$

where θh represents the horizontal viewing angle of the entire optical system of the imaging apparatus.

15. The electronic device according to claim 9, wherein the first polarizer and the second polarizer are disposed adjacent to each other, the first polarizer and the second polarizer connected to each other along a first direction,
   the imaging device has pixels arranged in a photodetection plane thereof in a matrix identified by the first direction and a second direction perpendicular thereto, and
   the third polarizer and the fourth polarizer are alternately disposed on an arrangement unit basis, the arrangement unit being a line or lines and the line formed of pixels in the first direction in the imaging device.

16. The electronic device according to claim 15, wherein the first polarizer and the second polarizer are disposed adjacent to each other on opposite sides of the second direction as a boundary.

* * * * *